US012785986B2

(12) United States Patent
Lyadala et al.

(10) Patent No.: US 12,785,986 B2
(45) Date of Patent: Nov. 3, 2026

(54) LAYERED DETECTION OF CHARACTER ANOMALIES IN EXCHANGED INFORMATION USING NEURAL NETWORKS

(71) Applicant: Bank of America Corporation, Charlotte, NC (US)

(72) Inventors: Avinash Lyadala, Hyderabad (IN); Maneesh Kumar Sethia, Hyderabad (IN); Abhijit Behera, Hyderabad (IN); Uppalaiah Kallem, Hyderabad (IN); Bharathi Tadepalli, Hyderabad (IN)

(73) Assignee: Bank of America Corporation, Charlotte, NC (US)

( * ) Notice: Subject to any disclaimer, the term of this patent is extended or adjusted under 35 U.S.C. 154(b) by 98 days.

(21) Appl. No.: 19/030,047

(22) Filed: Jan. 17, 2025

(65) Prior Publication Data

US 2026/0213953 A1 Jul. 23, 2026

(51) Int. Cl.

| | |
|---|---|
| ***H04L 29/06*** | (2006.01) |
| ***G06F 40/186*** | (2020.01) |
| ***G06N 3/08*** | (2023.01) |
| ***H04L 9/32*** | (2006.01) |

(52) U.S. Cl.
CPC .......... *H04L 9/3247* (2013.01); *G06F 40/186* (2020.01); *G06N 3/08* (2013.01)

(58) Field of Classification Search
CPC . H04L 63/3247; H04L 63/20; H04L 63/0421; H04L 63/1425; H04L 63/10; H04L 63/0263
See application file for complete search history.

(56) References Cited

U.S. PATENT DOCUMENTS

| | | | |
|---|---|---|---|
| 11,037,545 B2 | 6/2021 | Ogawa et al. | |
| 11,146,381 B2 * | 10/2021 | Miller | H04L 9/3239 |
| 11,297,084 B2 | 4/2022 | Huang et al. | |
| 11,558,423 B2 | 1/2023 | Gordon et al. | |
| 11,687,778 B2 | 6/2023 | Ciftci et al. | |

(Continued)

OTHER PUBLICATIONS

Avinash Lyadala, Images analysis using layered detection neural networks, U.S. Appl. No. 19/030,172, filed Jan. 17, 2025, pp. 1-58.

(Continued)

*Primary Examiner* — Longbit Chai

(57) ABSTRACT

An apparatus comprises a memory communicatively coupled to a processor. The processor may be configured to detect an attempt to exchange an electronic data stream between a transmitting device and a receiving device, train an artificial neural network based on historical data associated with one or more words formed by the text characters in the electronic data stream and multiple data exchange operations expected to be performed by the receiving device, determine, using the trained artificial neural network, that the text characters is logically positioned in the at least one image, determine, using the trained artificial neural network, that the text characters is contextually related to the data exchange operations expected to be performed by the receiving device, tag the at least one image as comprising an anomaly, and block additional electronic data streams between the transmitting device and the receiving device.

20 Claims, 6 Drawing Sheets

(56) References Cited

U.S. PATENT DOCUMENTS

| | | | |
|---|---|---|---|
| 11,790,237 | B2 | 10/2023 | Mathews et al. |
| 11,893,099 | B2 | 2/2024 | Ortiz et al. |
| 12,437,303 | B1 * | 10/2025 | Kallas .................... G06V 30/10 |
| 2019/0179861 | A1 * | 6/2019 | Goldenstein ........ G06F 16/9535 |
| 2020/0162266 | A1 * | 5/2020 | Miller ................... H04L 9/3239 |
| 2021/0173916 | A1 | 6/2021 | Ortiz et al. |
| 2021/0233204 | A1 | 7/2021 | Alattar et al. |
| 2022/0138286 | A1 | 5/2022 | Zage et al. |
| 2022/0138472 | A1 | 5/2022 | Mittal et al. |
| 2023/0066716 | A1 | 3/2023 | Zhang |
| 2024/0273676 | A1 | 8/2024 | Davies et al. |

OTHER PUBLICATIONS

Avinash Lyadala, Multimodal fusion analysis of images to determine deepfakes, U.S. Appl. No. 19/030,246, filed Jan. 17, 2025, pp. 1-54.

* cited by examiner

LAYERED DETECTION OF CHARACTER ANOMALIES IN EXCHANGED INFORMATION USING NEURAL NETWORKS

TECHNICAL FIELD

The present disclosure relates generally to operations associated with detecting character anomalies in exchange information, and more specifically to perform layered detection of character anomalies in exchanged information using neural networks.

BACKGROUND

In today' digital landscape, the proliferation of deepfake images and increasingly sophisticated fraudulent activities pose significant challenges to the security and trustworthiness of organizations. Traditional fraud detection systems, relying on rule-based methods or simple pattern recognition, are often ill-equipped to identify and mitigate the evolving threat landscape presented by deepfake technology. Deepfake images, meticulously crafted using advanced artificial intelligence techniques, can deceive even vigilant observers, making them potent tools for perpetrating identity theft, account takeover, and/or other fraudulent schemes. Furthermore, fraudulent activities using deepfakes extend beyond image manipulation, encompassing various forms of transactional fraud and/or social engineering attacks.

SUMMARY OF THE DISCLOSURE

In one or more embodiments, a system and method described herein are configured to detect data anomalies and/or deepfakes in data exchanges between at least two user devices. The systems are configured to detect and remove manipulated content comprising data anomalies and/or deepfakes using neural networks. In particular, the system may be configured to determine whether text (e.g., text characters) in images and/or documents is manipulated using deepfakes. The system and method are directed towards a system configured to evaluate received information comprising images and/or documents, extract relevant text communicated in the received information, and use a layered approach to determine whether the extracted text is authentic and/or is approved to be stored in one or more secures databases/servers. The layered approach may comprise parsing the received information through multiple provenance detectors that are configured to determine whether relevant text in the received information is accurate by evaluating text against a set of detection rules. The provenance detectors may be programmed triggers that are used to deny or approve the technical accuracy of text characters. As text characters are approved by the provenance detectors, approved text may be extracted from the received information using an Optical Character Recognition (OCR) system. The OCR system may be configured to parse out text that matches a training data set including scanned documents, predefined forms, and previously generated statements. The extracted text may be sent to a Multi-Layered Perceptron (MLP) neural network trained to determine whether the parsed-out text from the OCR is logically arranged to match one or more data exchange operations. Herein, the MLP may be configured to evaluate the positioning of text characters in an image, remove noise from the image, and align individual characters for future analyses. The MLP neural network may be trained to dynamically deny or accept text as the extracted texts are received. The MLP neural network may be configured to create and update one or more models based on negative and positive feedback after determined denied text or determined accepted text, respectively. If the text from the received information is approved by the multiple layers, then the text may be determined to be free of anomalies and/or deepfakes. If the text from the received information is denied by any of the layers, then the text is determined to comprise anomalies and/or deepfakes. As content comprising anomalies and/or deepfakes are determined, the system is configured to drop communication associated with the manipulated content and block additional communications from a source of the malicious content.

In one or more embodiments, the systems and methods described herein are integrated into a practical application of removing deepfakes and data anomalies from circulating in a network. In particular the system is configured to remove and/or filter out documents and/or images comprising deepfakes and data anomalies from data streams exchanged in the network. Accordingly, the systems and methods described herein address problems that are specific to network communications, the Internet, and the underlying computer systems that support those technologies.

In some embodiments, the system is configured to train one or more artificial intelligence algorithms to reduce and/or eliminate communications in the network comprising deepfakes and/or data anomalies. The systems may be configured to use trained artificial intelligence algorithms to determine and confirm whether content, such as text characters, from one or more images and/or documents comprises anomalies and/or deepfakes. In this regard, the systems may be configured to prevent deepfakes and data anomalies in text characters of images and/or documents. The system may be configured to adapt the training of the artificial intelligence algorithm to evaluate and/or analyze continuously changing text characters in electronic data streams exchanged between devices in the network.

The system may also be integrated into a practical application of providing enhanced security to network communications by intercepting information comprising anomalies and/or deepfakes and preventing the compromised information from reaching specific devices in the network. Compromised data packets and/or information in an electronic data stream may be part of one or more electronic attacks performed by one or more electronic attackers. The electronic attackers may be one or more bad actors attempting to access network resources in the network. The network resources may be one or more systems, databases, power resources, memory resources, and/or power resources associated with a receiving device of the at least two devices exchanging the electronic data streams. In particular, the system is configured to intercept electronic data streams between at least two devices in the network and evaluate the contents found in the electronic data streams using multiple layers of evaluation protocols to determine whether the content comprises anomalies and/or deepfakes. The layers of evaluation protocols may comprise a layer using provenance detectors, one or more layers comprising trained artificial intelligence algorithms, one or more layers comprising artificial neural networks, and/or one or more layers comprising multimodal fusion of one or more layers of security protocols. In the event that anomalies and/or deepfakes are detected, the systems are configured to drop electronic data streams found to comprise anomalies and/or deepfakes and block future communications from any transmitting devices determined to be associated with transmissions of compromised content. By dropping these electronic data streams and blocking future communications from transmitting devices that are determined to be associated with transmitting compromised content, the systems and methods described herein enhance the security of the network and underlying computer systems, as well as reduce the propagation of malware, spyware, and other malicious communications.

Technical problems caused by deepfakes and other forms of abnormal data may include: 1) theft of sensitive information in an organization; 2) infiltration of secured systems; 3) widespread misinformation and abuse; 4) destruction of communication and/or networking infrastructure as part of cyberattacks triggered by false and/or manipulated data; and 5) compromise of authentication and verification procedures. In one or more embodiments, the systems and methods described herein are directed to improvements in these areas of cybersecurity. Specifically, the system is configured to increase the security of underlying computer systems by filtering, preventing, and/or inhibiting electronic data streams comprising deepfakes and/or data anomalies from reaching specific user devices in a network.

With regards to 1), by removing deepfakes and anomalies from electronic data streams, the system protects against technical issues caused by deepfakes, such as data exfiltration, which comprises the theft of sensitive data from a database and/or a network. Deepfakes can be used in social engineering attacks to impersonate trusted individuals, which can lead to the theft of sensitive information. For example, deepfakes can be used to create fake biometric data to bypass biometric authentication systems. This allows attackers to gain unauthorized access to secure systems and sensitive information. The systems and methods described herein are configured to implement measures that reduce or prevent data exfiltration, which reduces the attack surface, making it more difficult for attackers to exploit vulnerabilities and gain unauthorized access to systems. By monitoring and preventing data exfiltration, organizations can more effectively detect and respond to security incidents, reducing the impact of potential breaches.

With regards to 2), the systems inhibit and/or prevent bad actors (e.g., attackers using deepfakes maliciously to access a network), from infiltrating secured systems. Herein, the systems intercept communications directed to specific user devices in the network and evaluate content in the communications for deepfakes and/or data anomalies. If deepfakes an/or anomalies are found, the systems eliminate the communication streams between a source of the deepfakes and a target (e.g., local) user device. By identifying and eliminating communication streams that include such deepfakes, the systems and methods described herein reduce the volume of malicious traffic on networks, which simplifies the task of network security monitoring and incident response.

With regards to 3) and 4), as the systems fend off and/or filter content comprising deepfakes, and the systems are configured to collect information associated with the source of the manipulated content to deny future communications between the source and the network. If a device is caught attempting to transmit deepfakes to user devices in the network, the systems are configured to permanently or semi-permanently ban any communications from the source (s) of manipulated data. The information collected from the source(s) of manipulated data may be also shared with other organizations and/or networks to denylist any user devices associated with transmissions of data anomalies and/or deepfakes. Deepfake files, especially video and audio files, can consume significant network bandwidth. By stopping the transmission of deepfake content, the overall bandwidth usage on the network is reduced. This reduction in bandwidth usage can lead to improved network performance, lower latency, and more efficient use of network resources for legitimate communications. This can also lead to a more stable and reliable network, with fewer instances of slowdowns or interruptions in service. Additionally, the network is protected from potential future malicious activities, such phishing attacks and social engineering. This enhances the overall security of the network, making it more resilient to cyber threats and reducing the risk of data breaches.

In one or more embodiments, the systems and the methods may be performed by an apparatus, such as the server. Further, the system may be a data exchange system, which comprises the apparatus. In addition, the system and the method may be performed as part of a process performed by the apparatus. As a non-limiting example, the apparatus may comprise a memory and a processor communicatively coupled to one another. The memory may be operable to store a device profile associated with a receiving device, the device profile comprising multiple entitlements for the receiving device.

The processor may be configured to detect an attempt to exchange an electronic data stream between a transmitting device and a receiving device. The electronic data stream may comprise at least one image. The at least one image may comprise multiple pixels. The at least one image may comprise multiple text characters. Further, the processor may be configured to electronically extract, from metadata associated with the at least one image, source information of the electronic data stream. The source information may comprise at least one identifier and an authenticity parameter associated with the transmitting device.

The processor may be configured to generate, based at least in part upon the entitlements in the device profile associated with the receiving device, multiple provenance detectors comprising an allowed communication source and an authenticity signature for the allowed communication source. The processor may be configured to use the provenance detectors to validate whether the at least one identifier matches the allowed communication source and validate whether the authenticity parameter matches the authenticity signature corresponding to the allowed communication source in response to validating that the at least one identifier matches the allowed communication source. Further, the processor may be configured to isolate, in the at least one image, one or more pixels of the pixels comprising the text characters into isolated pixels in response to validating that the authenticity parameter matches the authenticity signature corresponding to the allowed communication source, align, using an optical character recognition tool, the text characters in the isolated pixels, transform, using the optical character recognition tool, an aligned version of the text characters in the isolated pixels from an image format to a text format, and provide the text characters in the text format and the at least one image to an artificial neural network. In response, the processor is further configured to train the artificial neural network based on historical data associated with one or more words formed by the text characters and multiple data exchange operations expected to be performed by the receiving device, determine, using the trained artificial neural network, whether the text characters is logically positioned in the at least one image, and determine, using the trained artificial neural network, whether the text characters is contextually related to the data exchange operations expected to be performed by the receiving device in response to determining that the text characters are logically positioned in the at least one image. At this stage, the processor is configured to tag the at least one image as comprising an anomaly in response to determining that the text characters is not contextually related to the data exchange operations expected to be performed by the receiving device, drop the electronic data stream from the transmitting device to the receiving device, and block additional electronic data streams between the transmitting device and the receiving device.

Certain embodiments of this disclosure may include some, all, or none of these advantages. These advantages and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
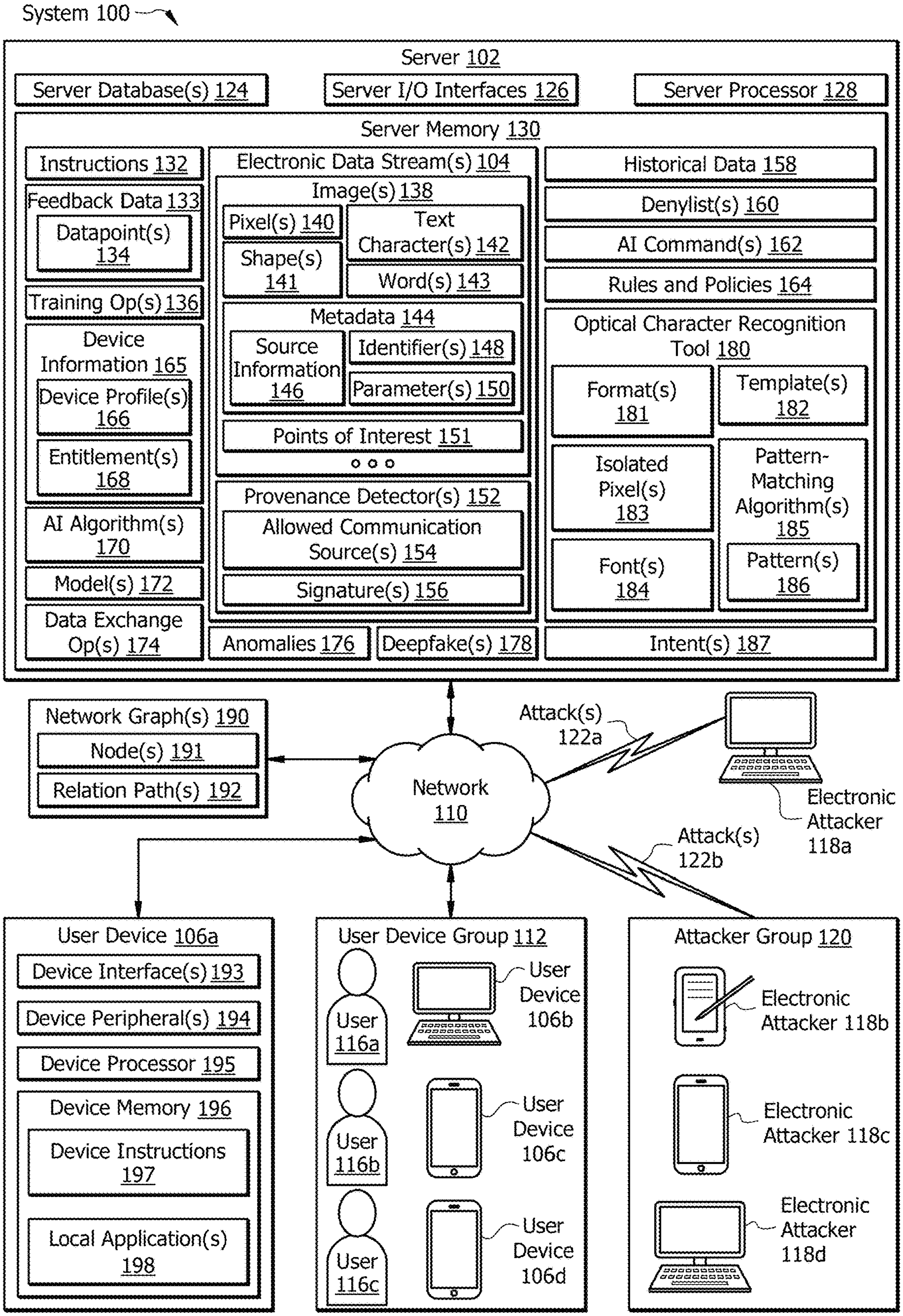
FIG. 1 illustrates a system in accordance with one or more embodiments.
Figure 2A:
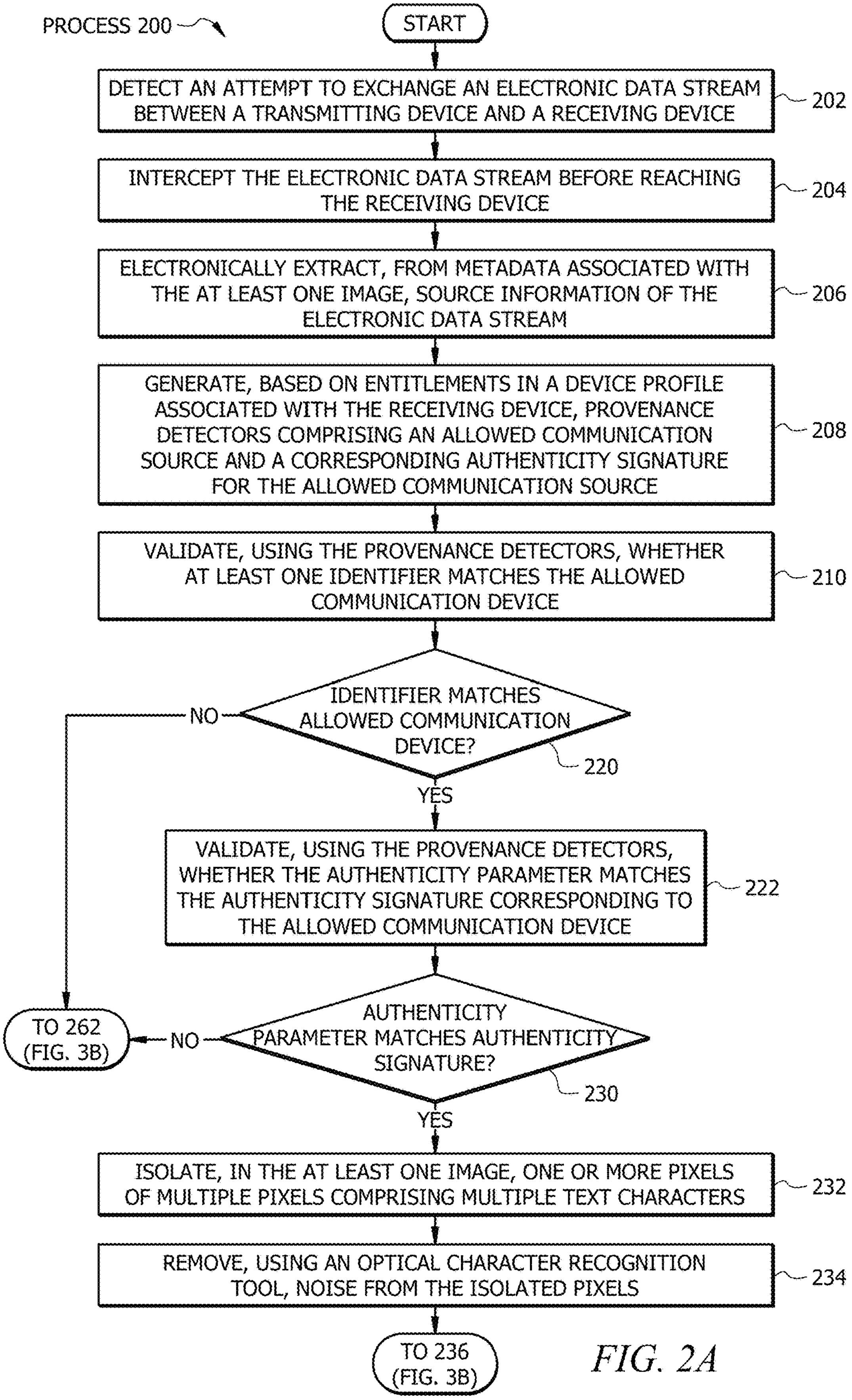
FIGS. 2A and 2B illustrate an example flowchart of a method of layered detection of character anomalies in exchanged information using neural networks performed by the system of FIG. 1 in accordance with one or more embodiments.
Figure 2B:
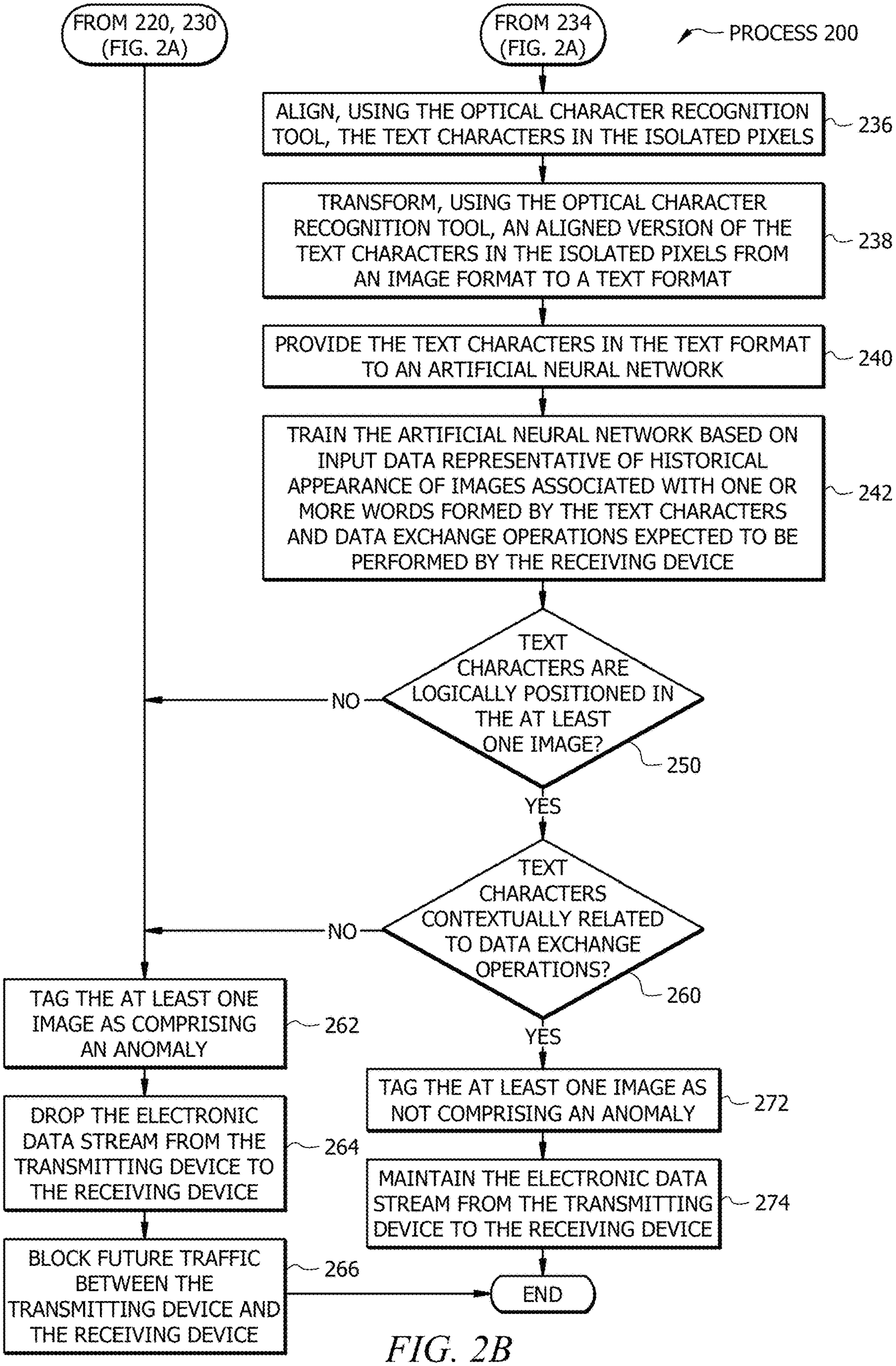
Figure 3A:
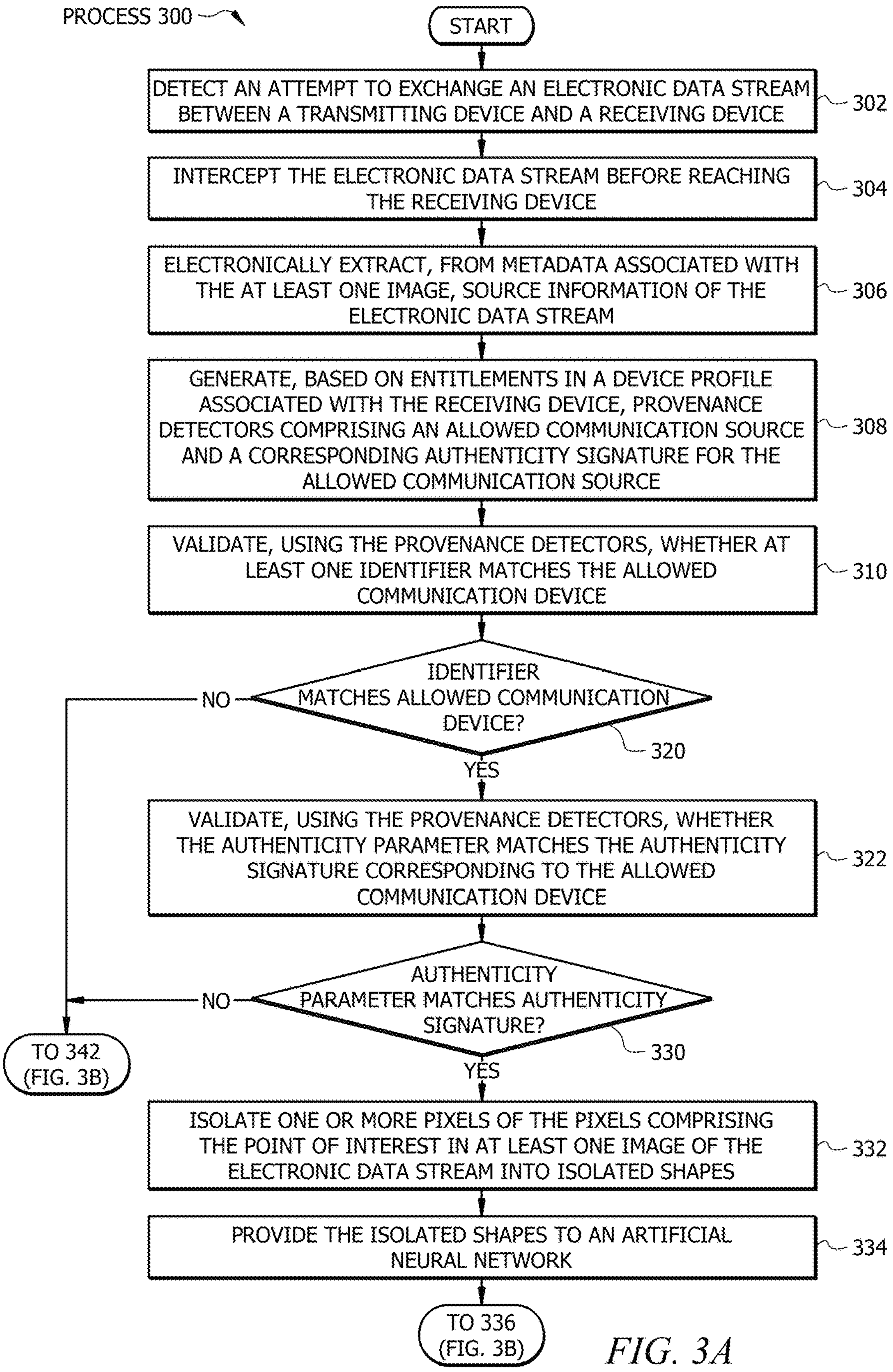
FIGS. 3A and 3B illustrate an example flowchart of a method of image analysis using layered detection neural networks performed by the system of FIG. 1 in accordance with one or more embodiments.
Figure 3B:
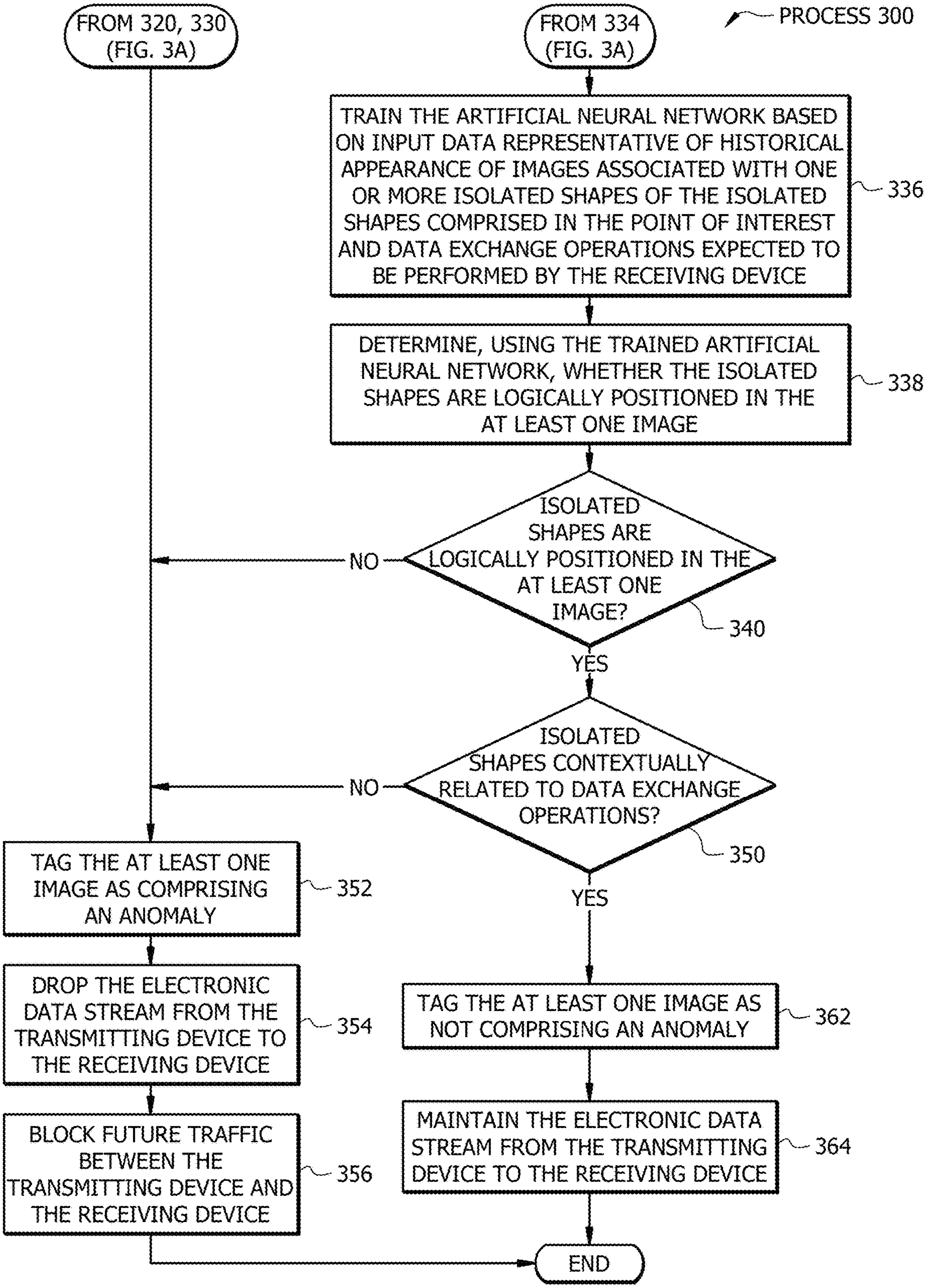
Figure 4:
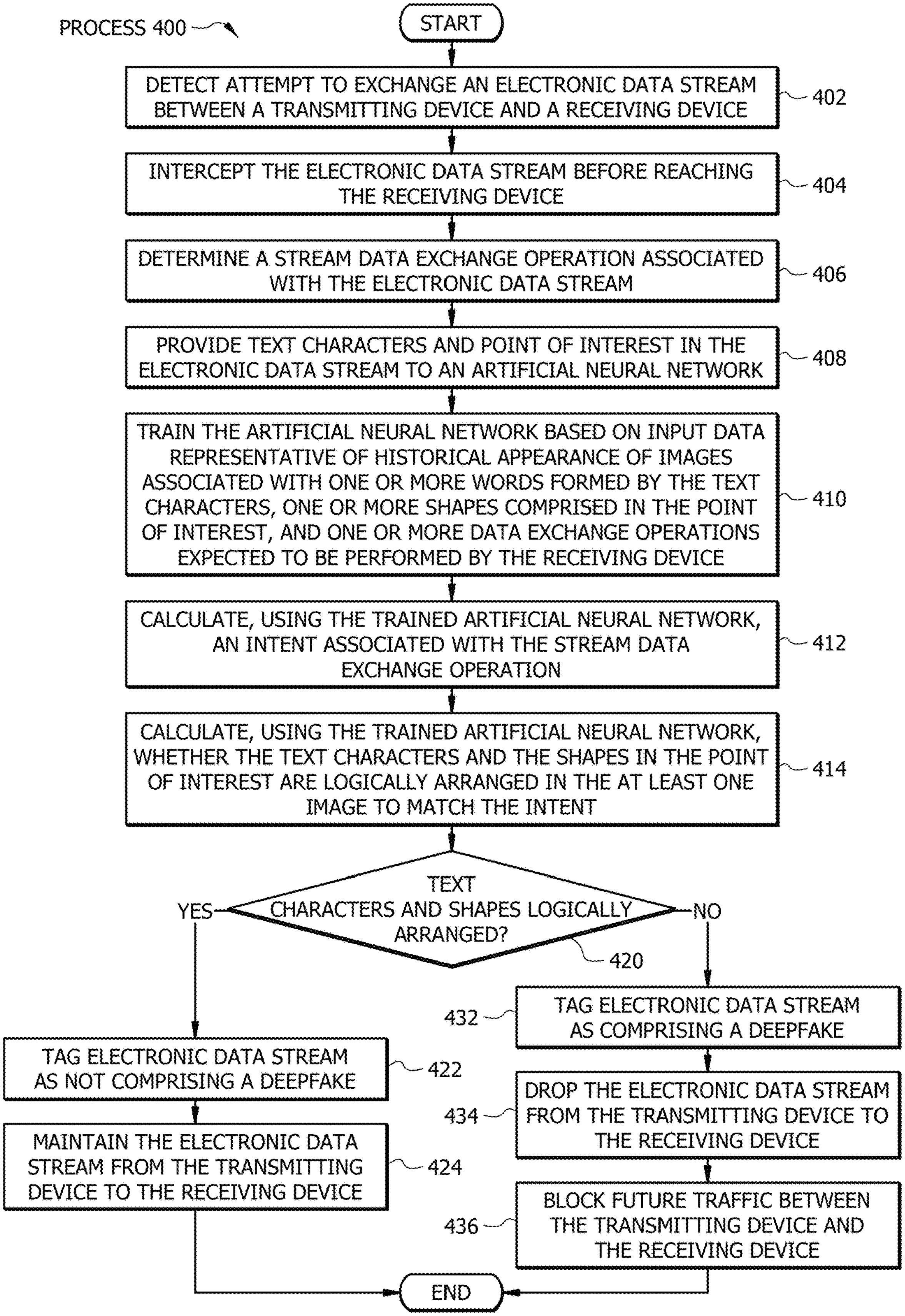
FIG. 4 illustrates an example flowchart of a method of multimodal fusion analysis of images to determine deepfakes performed by the system of FIG. 1 in accordance with one or more embodiments.

As described above, this disclosure provides various systems and methods to perform layered detection of character anomalies in exchanged information using neural networks. The disclosure provides various systems and methods to perform image analysis using layered detection neural networks. Further, the disclosure provides various systems and methods to perform multimodal fusion analysis of images to determine deepfakes. FIG. 1 illustrates a system 100 in which a server 102 is configured to intercept and control content exchanges in one or more electronic data streams 104. FIGS. 2A and 2B illustrates a process 200 performed by the system 100 of FIG. 1. FIGS. 3A and 3B illustrates a process 300 performed by the system 100 of FIG. 1. FIG. 4 illustrates a process 400 performed by the system 100 of FIG. 1.

System Overview

FIG. 1 illustrates an example system 100, in accordance with one or more embodiments. The system 100 may comprise a server 102 configured to intercept and control content exchanges in one or more electronic data streams 104. The system 100 includes a server 102 communicatively coupled to a user device 106*a*, a user device 106*b*, a user device 106*c*, and a user device 106*d* (collectively, user devices 106) via a network 110. The user devices 106 may be user nodes configured to trigger exchanges of data and/or perform one or more communication operations with the server 102 via the network 110. The user devices 106 may be working nodes configured to receive instructions to perform one or more communication operations based on instructions received from the server 102. In some embodiments, some of the user devices 106 may be clustered together in one or more user device groups 112. Each of the user devices 106 may be associated with one or more corresponding operators. These operators are shown as a user 116*a*, a user 116*b*, and a user 116*c* (collectively, users 116) in the user device groups 112. In FIG. 1, the user device group 112 is shown comprising the user 116*a* associated with the user device 106*b*, the user 116*b* associated with the user device 106*c*, and the user 116*c* associated with the user device 106*d*.

In one or more embodiments, the example of FIG. 1 shows an electronic attacker 118*a*, an electronic attacker 118*b*, an electronic attacker 118*c*, and an electronic attacker 118*d* (collectively, electronic attackers 118). In some embodiments, some of the electronic attackers 118 may be clustered together in one or more attacker groups 120. In FIG. 1, the attacker group 120 is shown comprising the electronic attacker 118*b*, the electronic attacker 118*c*, and the electronic attacker 118*d*. These electronic attackers 118 may be bad actors attempting to perform one or more attacks 122 (e.g., attacks 122*a* and attacks 122*b*) to the server 102, the user devices 106, the network, and/or the user device groups 112.

In one or more embodiments, the server 102 may comprise one or more server databases 124, one or more server input (I)/output (O) interfaces 126, at least one server processor 128, and at least one server memory 130 communicatively coupled to one another. In some embodiments, the server memory 130 may comprise instructions 132, feedback data 133 comprising one or more datapoints 134, one or more training operations 136, the one or more electronic data streams 104 comprising one or more images 138 comprising one or more pixels 140, one or more shapes 141, one or more text characters 142, and one or more words 143 formed by the pixels 140, and corresponding metadata 144 comprising one or more source information 146, one or more identifiers 148, one or more parameters 150 (e.g., authenticity parameter), and one or more points of interest 151, one or more provenance detectors 152 comprising one or more allowed communication sources 154 and one or more signatures 156, historical data 158, one or more denylists 160, one or more artificial intelligence (AI) commands 162, one or more rules and policies 164, device information 165 comprising one or more device profiles 166 associated with one or more entitlements 168 for specific user devices 106 to access one or more services (e.g., applications) in a communication network (e.g., the network 110), one or more AI algorithms 170 configured to train, create, and/or update one or more models 172, one or more data exchange operations 174, one or more anomalies 176, one or more deepfakes 178, at least one optical character recognition tool 180 comprising one or more formats 181, one or more templates 182, one or more isolated pixels 183, one or more text character fonts 184, and one or more pattern-matching algorithms 185 configured to analyze and/or evaluate one or more patterns 186, and/or one or more intents 187.

In some embodiments, the system 100 may comprise one or more network graphs 190. The network graphs 190 may be communicatively coupled to the server 102 and/or the user devices 106 in the user device groups 112 via the network 110. In the example of FIG. 1, the network graphs 190 comprise one or more nodes 191 and one or more relation paths 192.

Referring to the user device 106*a* a non-limiting example, the user device 106*a* may comprise one or more device interfaces 193, one or more device peripherals 194, at least one device processor 195, and at least one device memory 196 communicatively coupled to one another. The device memory 196 may comprise device instructions 197 and/or one or more local applications 198.

System Components

Server

The server 102 is generally any device or apparatus that is configured to process data and communicate with computing devices (e.g., the user devices 106), additional databases, systems, and the like, via the one or more server I/O interfaces 126 (i.e., a user interface or a network interface). The server 102 may comprise the server processor 128 that is generally configured to oversee operations of the processing engine. The operations of the processing engine are described further below in conjunction with the system 100 described in FIG. 1, the process 200 in FIGS. 2A and 2B, the process 300 described in FIGS. 3A and 3B, and the process 400 described in FIG. 4.

The server 102 comprises multiple server databases 124 configured to provide one or more memory resources to the server 102 and/or the user devices 106. The server 102 comprises the server processor 128 communicatively coupled with the server databases 124, the server I/O interfaces 126, and the server memory 130. The server 102 may be configured as shown, or in any other configuration. In one or more embodiments, the server databases 124 are configured to store data that enables the server 102 to configure, manage and coordinate one or more middleware systems. In some embodiments, the server databases 124 store data used by the server 102 to function as a halfway point in between one or more services and other tools or databases.

In one or more embodiments, the server I/O interfaces 126 may be configured to enable wired and/or wireless communications. The server I/O interfaces 126 may be configured to communicate data between the server 102 and other user devices (i.e., the user devices 106), network devices (i.e., routers in the network 110), systems, or domain(s) via the network 110. For example, the server I/O interfaces 126 may comprise a WI-FI interface, a LAN interface, a WAN interface, a modem, a switch, or a router. The server processor 128 may be configured to send and receive data using the server I/O interfaces 126. The server I/O interfaces 126 may be configured to use any suitable type of communication protocol. In some embodiments, the server I/O interfaces 126 may be an admin console comprising a web browser-based or graphical user interface used to manage a middleware server domain via the server 102. A middleware server domain may be a logically related group of middleware server resources that managed as a unit. A middleware server domain may comprise the server 102 and one or more managed servers. The managed servers may be standalone devices and/or collected devices in the server cluster. The server cluster may be a group of managed servers that work together to provide scalability and higher availability for the services. In this regard, the services are developed and deployed as part of at least one domain. In other embodiments, one instance of the managed servers in the middleware server domain may be configured as the server 102. The server 102 provides a central point for managing and configure the managed servers and any of the one or more services.

The server processor 128 comprises one or more processors communicatively coupled to the server memory 130. The server processor 128 may be any electronic circuitry, including, but not limited to, state machines, one or more central processing unit (CPU) chips, logic units, cores (e.g., a multi-core processor), field-programmable gate arrays (FPGAs), application-specific integrated circuits (ASICs), or digital signal processors (DSPs). The server processor 128 may be a programmable logic device, a microcontroller, a microprocessor, or any suitable combination of the preceding. The one or more server processor 128 are configured to process data and may be implemented in hardware or software executed by hardware. For example, the server processor 128 may be 8-bit, 16-bit, 32-bit, 64-bit or of any other suitable architecture. The server processor 128 may include an arithmetic logic unit (ALU) for performing arithmetic and logic operations, processor registers that supply operands to the ALU and store the results of ALU operations, and a control unit that fetches the instructions 132 from the server memory 130 and executes them by directing the coordinated operations of the ALU, registers and other components. In this regard, the one or more server processor 128 are configured to execute various instructions. For example, the one or more server processor 128 are configured to execute the instructions 132 to implement the functions disclosed herein, such as some or all of those described with respect to FIGS. 1-4. In some embodiments, the functions described herein are implemented using logic units, FPGAs, ASICs, DSPs, or any other suitable hardware or electronic circuitry.

In one or more embodiments, the server T/O interfaces 126 may be any suitable hardware and/or software to facilitate any suitable type of wireless and/or wired connection. These connections may include, but not be limited to, all or a portion of network connections coupled to the Internet, an Intranet, a private network, a public network, a peer-to-peer network, the public switched telephone network, a cellular network, a local area network (LAN), a metropolitan area network (MAN), a wide area network (WAN), and a satellite network. The server I/O interfaces 126 may be configured to support any suitable type of communication protocol as would be appreciated by one of ordinary skill in the art. In one or more embodiments, the server I/O interfaces 126 may comprise one or more sensors configured to evaluate physical phenomena surrounding the server 102 and/or one or more of the user devices 106. The sensors may be proximity sensors, optical sensors, and the like.

The server memory 130 may be volatile or non-volatile and may comprise a read-only memory (ROM), random-access memory (RAM), ternary content-addressable memory (TCAM), dynamic random-access memory (DRAM), and static random-access memory (SRAM). The server memory 130 may be implemented using one or more disks, tape drives, solid-state drives, and/or the like. The server memory 130 is operable to store the instructions 132, the feedback data 133 comprising the one or more datapoints 134, the one or more training operations 136, the one or more electronic data streams 104 comprising the one or more images 138 comprising the one or more pixels 140, the one or more shapes 141 and the one or more text characters 142 formed by the pixels 140, and the correspond ding metadata 144 comprising the one or more source information 146, the one or more identifiers 148, the one or more parameters 150 (e.g., authenticity parameter), and the one or more points of interest 151, the one or more provenance detectors 152 comprising one or more allowed communication sources 154 and the one or more signatures 156, the historical data 158, the one or more denylists 160, the one or more AI commands 162, the one or more rules and policies 164, the device information 165 comprising the one or more device profiles 166 associated with one or more entitlements 168 for specific user devices 106 to access the one or more services (e.g., applications) in the communication network (e.g., the network 110), the one or more AI algorithms 170 configured to train, create, and/or update the one or more models 172, the one or more data exchange operations 174, the one or more anomalies 176, the one or more deepfakes 178, and the at least one optical character recognition tool 180 comprising the one or more formats 181, the one or more templates 182, the one or more isolated pixels 183, the one or more text character fonts 184, and the one or more pattern-matching algorithms 185 configured to analyze and/or evaluate the one or more patterns 186. The instructions 132 may comprise any suitable set of instructions, logic, rules, or code operable to execute the server processor 128.

The one or more data exchange operations 174 may be one or more data exchanges performed between two or more user devices 106 in the system 100. The user devices 106 may comprise the server 102 and one or more of the user devices 106 among others. In one or more embodiments, the data exchange operations 174 may be audio communications exchanged as part of audio conversations (e.g., during a telephonic call) between two or more user devices. The data exchange operations 174 may be image and/or text communications exchanged as part of image-based conversations (e.g., during videocalls and/or chat exchanges) between two or more user devices.

The feedback data 133 may comprise information associated with one or more of the data exchange operations 174, information associated with one or more entities, and one or more tracked activities associated with the user devices 106. The feedback data 133 may comprise information provided by and/or obtained from the user devices 106 during one or more data exchange operations 174 in the network 110. The server 102 may be configured to perform one or more retrieving operations configured to determine feedback data 133 in the tracked activities from the data exchange operations 174 and generate one or more reports associated with interactions of the user devices 106 in the network 110. The feedback data 133 may be collected continuously without interruptions and/or periodically over time and/or periods of time. The feedback data 133 may comprise one or more datapoints 134 referencing one or more physical phenomena and/or aspects of a portion of one or more users 116. The feedback data 133 may be obtained via one or more models 172 configured with a natural language processing (NPL) that identifies data exchanges associated with one or more of the users 116. The feedback data 133 may be captured via the one or more server I/O interfaces 126 and/or the one or more device interfaces 193. The feedback data 133 may comprise multiple sound, text, and/or action data samples. Each data sample may comprise a magnitude and a duration. The feedback data 133 may be configured to reference one or more attempted actions associated with the data exchange operations 174.

The feedback data 133 may indicate one or more changes in the behavior associated with one or more of the user devices 106. In one or more embodiments, the datapoints 134 are information data representative on one or more aspects of the data exchange operations 174 performed and/or triggered by the one or more user devices 106 in the network 110. The datapoints 134 may be data that represents extracted information and/or summarized information of the feedback data 133 associated with one or more operations attempted and/or performed by the user devices 106. In the example of FIG. 1, the datapoints 134 may be business metadata used by one of the applications and may be dynamic in nature. The datapoints 134 may be individual aspects of the feedback data 133. For example, in feedback data 133 comprising an image of a portion of an iris scan, the datapoints 134 may be individual pixels 140 of the image 138 comprising one or more data categorization formats and one or more data types.

The one or more data exchange operations 174 may be one or more operations executed by the server processor 128 configured to enable data objects to be exchanged between the user devices 106 and/or the server 102. In one or more embodiments, the data exchange operations 174 may be configured to indicate one or more data objects to be exchanged between the server 102 and at least one of the user devices 106. The server 102 may be configured to generate and analyze one or more data exchange operations 174 to confirm whether one or more user devices 106 associated with data exchange operations 174 are legitimately associated with at least one of the user devices 106. The server 102 may be configured to perform one or more operations in which the server 102 is configured to confirm whether one or more data exchange operations 174 belong to a specific user device 106.

In one or more embodiments, the one or more training operations 136 comprise one or more operations executed in conjunction with the one or more operations of the AI algorithms 170. The one or more training operations 136 may be configured to structure and analyze the feedback data 133, the images 138 in the electronic data streams 104, historical data 158 associated with operations performed by the user devices 106, the device information 165, the rules and policies 164, and/or one or more analysis results from the provenance detectors 152 and/or the optical character recognition tool 180. The training operations 136 may be configured to use some, or all, of the aforementioned data as input parameters to update, regulate, and/or modify the network graphs 190 and/or the one or more models 172. The one or more analysis results may be one or more results of one or more analyses performed by the server processor 128. The analyses may be performed as part of one or more operations triggered after executing the one or more instructions 132 (e.g., comprising executing the AI algorithm 170). The analysis results may be structured data comprising information in the form of lists, tables, and/or databases among others.

As part of the training operations 136, the server 102 may be configured to perform one or more probabilistic linkage operations. The probabilistic linkage operations may comprise correlating and combining device information 165 comprising alphanumeric identifiers (IDs), speech patterns, biometric data (e.g., iris registry, facial images, and like), and one or more activity and/or interaction patterns of user devices 106 associated with specific device profiles 166. In one or more embodiments, the probabilistic linkage operations may comprise matching interactions in the communication network to one or more device profiles by executing the AI algorithm 170 to use a Fellegi-Sunter probabilistic model to find links using mathematical weights coupled to the feedback data comprising biometric data analysis to find suspicious operations. In some embodiments, the Fellegi-Sunter model may be one or more of the models 172 configured to evaluate one or more datapoints 134 in the feedback data 133 in order to generate a match probability between two or more records. The probabilistic linkage operations may be configured to determine and consider a probability of a given observation (e.g., an identified operation and/or interaction matching patterns of another entity in the system 100) given one or more matching records and a probability of a given observation given one or more non-matching records.

As part of the training operations 136, the server 102 may be configured to perform record linking operations. The record linking operations may be one or more operations configured to evaluate and/or analyze information associated with one or more operations of the user devices 106 accessing the network 110. The record linking operations may be stored in one or more data formats. The server 102 may be configured to generate one or more access commands based on feedback data 133. In this regard, the record linking operations may be operations configured to indicate modifications and/or assignments of one or more network resources in the network 110. The record linking operations may comprise results of one or more operations of the processing engine configured to perform as operations that retrieve and analyze the feedback data 133. The record linking operations may be configured to establish one or more communication links configured to enable access between a user device 106 determined to perform one or more legitimate data exchange operations 174.

In one or more embodiments, the one or more data linking operations comprise one or more operations executed in conjunction with the one or more operations of the AI algorithms 170. The one or more data linking operations may be configured to show one or more patterns comprising one or more intents to perform a specific data exchange operation 174. The data linking operations may be configured to represent one or more action items performed to at least partially fulfill one or more target operations associated with the feedback data 133 and/or the data exchange operations 174. In some embodiments, the data linking operations may show intents of actions to be performed to meet one or more target commands at least partially. The data linking operations may be mapped to one or more existing data exchange operations 174. The data linking operations may show predicted future behaviors that one or more of the user devices 106 are expected to perform in the communication network. In some embodiments, the data linking operations may be one or more assumed actions associated with the data exchange operations 174.

In some embodiments, each of the data linking operations may connect and/or release the datapoints 134 in sequence to represent an intent and/or a pattern. The data linking operations may be representative of an appearance of the datapoints 134 in specific locations within the feedback data 133. For example, for feedback data 133 comprising a portion of an image of an eye (e.g., obtained from an iris scan), one or more data linking operations may comprise lines shaping the eye and/or portions of the eye. In this regard, the data linking operations may reference and/or show connectivity between one or more pixels in the image of the eye. The data linking operations may be generated, created, evaluated, and/or analyzed in real-time. The data linking operations may comprise multiple portions and/or sections. These portions and/or sections may be evaluated and/or analyzed individually and/or in clusters (e.g., groups).

The historical data 158 may be historic information associated with one or more user devices 106 in a communication network comprising several communication sites. The historical data 158 may comprise one or more reference datapoints representing one or more trends associated with resource usage and/or power consumption for a specific user device 106, a group of user devices 106, and/or several user devices 106 associated with one or more device profiles 166 in the communication network. The historical data 158 may be feedback data 133 that is previously processed and determined to match device information 165 associated with one or more device profiles 166. The reference datapoints may be one or more datapoints 134 that are previously processed and determined to match device information 165 associated with one or more device profiles 166.

In one or more embodiments, the training operations 136 may be replaced, updated, and/or modified dynamically. Further, the training operations 136 may be replaced, updated, and/or modified periodically. In some embodiments, the one or more models 172 may be configured trained to guide performance of the training operations 136 upon executing one or more of the AI algorithms 170.

In some embodiments, one or more denylists 160 may comprise alerts generated to one or more user devices 106 in the communication network. In this regard, the denylists 160 may associate callers to the one or more device profiles 166 with fraudulent remarks if an entity is identified to be a bad actor (e.g., one or the electronic attackers 118). The alerts may be warnings generated for the user devices 106 in the form of feedback (e.g., notifications, tactile feedback, and/or visual feedback among others). The denylists 160 may be lists comprising online information related to one or more identified electronic attackers 118, spam callers, and otherwise blocked callers. The server 102 may reference the denylists 160 to inform one or more of the user devices 106 that a communication request should not be received. The server 102 may be configured to update the denylists 160 with new information collected from one or more of the electronic attackers 118.

The device information 165 may comprise the one or more device profiles 166, one or more entitlements 168, and one or more services. In one or more embodiments, the device profiles 166 may comprise multiple profiles associated with one or more entitlements 168 to access and/or modify the services. Each of the device profiles 166 may be associated with one or more entitlements 168. The entitlements 168 may indicate that a given user device 106 is allowed to access one or more network resources in accordance with the one or more rules and policies 164. The entitlements 168 may indicate that a given user device 106 is allowed to perform one or more operations in the system 100 (e.g., provide a specific application data access to one of the users 116). To secure or protect operations of the user devices 106 from bad actors, the entitlements 168 may be assigned to a given device profile 166 in accordance with updated security information, which may provide guidance parameters to the use of the entitlements 168 based at least upon corresponding rules and policies 164. In one or more embodiments, the one or more services perform one or more application operations using one or more access commands. In some embodiments, the device profiles 166 may comprise multiple profiles for the users 116. Each device profile 166 may comprise one or more entitlements 168. As described above, the entitlements 168 may indicate that a given user 116 is allowed to access one or more network resources in accordance with one or more rules and policies 164. The entitlements 168 may indicate that a given user 116 is allowed to perform one or more data exchanges with the server 102 via the network 110. In one or more embodiments, each of the device profiles 166 may comprise information about at least one user 116 entitled to trigger one or more data exchange operations 174.

In one or more embodiments, the AI algorithms 170 may be executed by the server processor 128 to be trained to evaluate the data exchange operations 174, the feedback data 133, and/or any other data elements, data records, and/or analysis results stored in the server memory 130. Further, the trained AI algorithms 170 may be configured to interpret and transform one or more request for access to network resources, the one or more data exchange operations 174, the feedback data 133, and/or the instructions 132 into structured data sets and subsequently stored as files or tables. The trained AI algorithms 170 may cleanse, normalize raw data, and derive intermediate data to generate uniform data in terms of encoding, format, and data types. The trained AI algorithms 170 may be executed to run user queries and advanced analytical tools on the structured data and/or the unstructured data in accordance with one or more models 172. The trained AI algorithms 170 may be configured to generate the one or more AI commands 162 based on one or more results of the training operations 136. The AI commands 162 may be parameters that proactively trigger one or more of the training operations 136. The AI commands 162 may be combined with the existing instructions 132 to dynamically trigger and/or perform the training operations 136 or one or more of the operations in the process 200 of FIGS. 2A and 2B, the process 300 of FIGS. 3A and 3B, and the process 400 of FIG. 4. The AI commands 162 may be configured to trigger one or more cognitive AI operations in accordance with one or more models 172. The models 172 may be trained and/or retrained by the one or more AI algorithms 170 based on historic information associated with any training operations 136 performed with the server 102.

The rules and policies 164 may be security configuration commands or regulatory operations predefined by an organization or one or more users 116. In one or more embodiments, the rules and policies 164 may be dynamically defined by the one or more users 116. The rules and policies 164 may be prioritization rules configured to instruct one or more user devices 106 to perform one or more evaluating operations or perform one or more operations in the system 100 in a specific communication operation 108. The one or more rules and policies 164 may be predetermined or dynamically assigned by a corresponding user 116 or an organization associated with the users 116.

In one or more embodiments, the server databases 124 may be one or more repositories configured to store information. In one example, the server 102 may determine the server processor 128 is available (e.g., running) to perform a specific service. In another example, the server 102 may determine that a specific managed server is running to enable a testing application and/or perform the specific service upon receiving a server response indicating that a corresponding managed server is available to perform the service. The server databases 124 may be configured to store one or more representations of data instead of storing coded data. In this regard, the representations may be encoded in accordance with an encoder configured to identify and/or verify exchanged information. For example, the server databases 124 may comprise one or more representations of the feedback data 133. As the feedback data 133 is obtained, the server processor 128 may be configured to process the feedback data 133 in accordance with the one or more aforementioned operations.

The electronic data streams 104 may be one or more continuous and/or intermittent flows of data packets, information, and/or any data elements exchanged as part of one or more of the data exchange operations 174. The electronic data streams 104 may comprise data that is transmitted in packets. The electronic data streams 104 may be used to analyze data in real-time to gain insights into a the one or more operations. The electronic data streams 104 may be exchanged between user devices 106 at different rates of speed. The rates of speed may be in the magnitudes of bits per second, bits per minute, and the like. The electronic data streams 104 may comprise multiple data types such as sound data, image data, and the like. The electronic data streams 104 may comprise a single data stream or multiple data streams combined into a single transmission. The electronic data streams 104 may be configured to provide one or more of the streams to different user devices 106. In some embodiments, data packets in the electronic data streams 104 may be transmitted individually and/or in batches. The images 138 in the electronic data streams 104 may comprise multiple formats, resolution, and/or configuration aspects. The pixels 140 may be one or more aspects of the image 138. The pixels 140 may be the smallest unit of measurement for a given image 138. In digital imaging, the pixels 140 may be the smallest addressable element in a raster image, or the smallest addressable element in a dot matrix display device. Each of the pixels 140 may be a sample of an original image 138. In some embodiments, a number of the pixels 140 correlates to an accurate representation of an original version of the image 138. An intensity of each pixel may be variable. The text characters 142 may be any letter, number, space, punctuation mark, and/or symbol in the images 138. The metadata 144 may be data that provides information about other data. In some embodiments, the metadata 144 may be representative of contextual information associated with the one or more images 138. The metadata 144 may comprise descriptive information about a resource, such as title, abstract, author, and/or related keywords. The metadata 144 may comprise contextual information about containers of data and indicates how compound objects are put together comprising data types, data versions, data relationships, and other data characteristics of digital materials. The metadata 144 may comprise information to help manage a resource, such as a resource type, resource permissions, and/or creation data. The metadata 144 may comprise information about contents and quality of statistical data. The metadata 144 may comprise process data associated with collection, processing, and/or production of statistical data. The source information 146 may be comprised in the metadata 144 to reference a source of the images 138. The identifiers 148 may be comprised in the metadata 144 to reference one or more IDs and/or signatures associated with a source of the data stream. The parameters 150 may be one or more aspects of the data configured to authenticate aspects of the data (e.g., verifying precedence of the data). The point of interest 151 may be one or more portions of the image 138 determined to comprise one or more specific shapes 141 and/or one or more specific text characters 142.

The anomalies 176 may be one or more abnormal, peculiar, and/or unexpected aspects of a document and/or an image 138. The anomalies 176 may be one or more deviations in an expected image and/or a document. For example, an anomaly 176 in an image 138 may be a shape 141 with a different color in an image 138 than a color that are expected. In another example, an anomaly 176 in an image 138 may be a word 143 with different text characters 142 in an image 138 than the text characters 142 that are expected. The deepfakes 178 may be images and/or documents that are maliciously digitally and/or physically modified to alter one or more information elements in the data without prior knowledge of a recipient. The deepfakes 178 may comprise one or more subtle changes to shapes 141, text characters 142 and/or individual pixels 140.

The provenance detector 152 may be one or more triggers configured to use data provenance to identify the anomalies 176, the deepfakes 178, and/or other threats. The provenance detector 152 may be configured to comprise a record of history of a data object, including ownership, location, and/or custody. The provenance detector 152 may be configured functions to analyze the history of the data to identify inconsistencies or other indicators of threats. In one or more embodiments, the provenance detector 152 are updated outside a maintenance window. The provenance detector 152 are updated during a maintenance window. The provenance detector 152 may be updated using one or more provenance-based intrusion detection systems (PIDS). The PIDS may be configured to analyze data in the electronic data streams 104 and corresponding properties, as well as the flow of information associated with transmitting and receiving devices of the one or more data exchange operations 174. The allowed communication sources 154 may be one or more lists, individual data records, and/or symbolic references to specific transmitting devices (e.g., user devices 106 and/or network devices communicatively coupled to the network 110. The signatures 156 may be one or more representations of a key, access command, and/or validation information associated with a specific transmitting device. The allowed communication sources 154 and/or signatures 156 may be configured to be used to authenticate some, or all, of the information electronically extracted from the electronic data streams 104.

While in some embodiments, the server 102 is shown comprising multiple images 138, additional data elements and/or data records may be exchanged, transmitted, and/or received in the electronic data streams 104. For example, the electronic data streams 104 may comprise documents, sound clips, the images 138, and/or any other data that may be exchanged between two or more user devices 106, at least one user device 106 and a network device (not shown), and/or at least one user device 106 and the server 102.

The at least one optical character recognition tool 180 may comprise the one or more formats 181, the one or more templates 182, the one or more isolated pixels 183, the one or more text character fonts 184, and the one or more pattern-matching algorithms 185 configured to analyze and/or evaluate one or more patterns 186. The optical character recognition tool 180 may be configured to identify and electronically extract one or more text characters 142 from an image 138. The optical character recognition tool 180 may be configured to store many different formats 181, templates 182, and/or text character fonts 184 to use as reference from an internal database. The optical character recognition tool 180 may be configured to use one or more pattern-matching algorithms 185 to compare text images, character by character, to against an internal database. If the text characters 142 in a given image 138 match the information in the internal database word 143 by word 143, the optical character recognition tool 180 may be configured to isolate one or more of the pixels 140 into one or more isolated pixels 183. The one or more formats 181 may be configured to reference one or more of shape, size, and general makeup of text characters 142 in one of the images 138. The one or more templates 182 may be one or more forms, molds, and/or reference pattern used as a guide to identify and/or determine text characters 142. The one or more text character fonts 184 may be particular sizes, weights and style of a typeface. The one or more pattern-matching algorithms 185 may be executed to search for specific patterns in a large set of data. The pattern-matching algorithms 185 may be used in developing predictive models that are able to make accurate predictions based on input data.

In one or more embodiments, the intents 187 may be one or more target operations configured to be performed as part of one or more data exchange operations 174 in the communication network. The server 102 may be configured to generate one or more suggestions comprising action items to perform, start, trigger, and/or complete the target operations. In some embodiments, the server 102 may be configured to evaluate the target operations and determine an intent 187 based on the target operations.

User Device

In one or more embodiments, each of the user devices 106 (e.g., the user device 106*a*, the user devices 106*b*-106*d* in the user device group 112) may be any computing device configured to communicate with other devices, such as the server 102, other user devices 106 in the user device group 112, databases, and the like in the system 100. Each of the user devices 106 may be configured to perform specific functions described herein and interact with the server 102 and/or any other user devices 106. Examples of the user devices 106 comprise, but are not limited to, a laptop, a computer, a smartphone, a tablet, a smart device, an IoT device, a simulated reality device, an augmented reality device, or any other suitable type of device. The requests may be provided by the user devices 106 via one or more interfaces comprising input displays, voice microphones, or sensors capturing gestures performed by a corresponding user 116.

The user devices 106 may be hardware configured to create, transmit, and/or receive information. The user devices 106 may be configured as a provider node or as worker nodes. The user devices 106 may be configured to receive inputs from a user, process the inputs, and generate data information or command information in response. The data information may include documents or files generated using a graphical user interface (GUI).

Referring to the user device 106*a* as a non-limiting example, the command information may include input selections/commands triggered by a user using a peripheral component or one or more device peripherals 194 (i.e., a keyboard) or an integrated input system (i.e., a touchscreen displaying the GUI). The user devices 106 may be communicatively coupled to the server 102 via a network connection (i.e., the device peripherals 194). The user devices 106 may transmit and receive data information, command information, or a combination of both to and from the server 102 via the device interfaces 193. In one or more embodiments, the user devices 106 are configured to exchange data, commands, and signaling with the server 102. In some embodiments, the user devices 106 are configured to receive at least one security system configuration from the server 102 to implement a security system (one of the one or more local applications 198) at one of the user devices 106.

In one or more embodiments, the device interfaces 193 may be any suitable hardware or software (e.g., executed by hardware) to facilitate any suitable type of communication in wireless or wired connections. These connections may comprise, but not be limited to, all or a portion of network connections coupled to additional user devices 106, the server 102, the Internet, an Intranet, a private network, a public network, a peer-to-peer network, the public switched telephone network, a cellular network, a LAN, a MAN, a WAN, and a satellite network. The device interfaces 193 may be configured to support any suitable type of communication protocol.

In one or more embodiments, the one or more device peripherals 194 may comprise audio devices (e.g., speaker, microphones, and the like), input devices (e.g., keyboard, mouse, and the like), or any suitable electronic component that may provide a modifying or triggering input to the user devices 106. For example, the one or more device peripherals 194 may be speakers configured to release audio signals (e.g., voice signals or commands) during media playback operations. In another example, the one or more device peripherals 194 may be microphones configured to capture audio signals. In one or more embodiments, the one or more device peripherals 194 may be configured to operate continuously, at predetermined time periods or intervals, or on-demand.

The device processor 195 may comprise one or more processors communicatively coupled to and in signal communication with the device interfaces 193, the device peripherals 194, and the device memory 196. The device processor 195 is any electronic circuitry, including, but not limited to, state machines, one or more CPU chips, logic units, cores (e.g., a multi-core processor), FPGAs, ASICs, or DSPs. The device processor 195 may be a programmable logic device, a microcontroller, a microprocessor, or any suitable combination of the preceding. The one or more processors in the device processor 195 are configured to process data and may be implemented in hardware or software executed by hardware. For example, the device processor 195 may be an 8-bit, a 16-bit, a 32-bit, a 64-bit, or any other suitable architecture. The device processor 195 may comprise an ALU to perform arithmetic and logic operations, processor registers that supply operands to the ALU, and store the results of ALU operations, and a control unit that fetches software instructions such as device instructions 197 from the device memory 196 and executes the device instructions 197 by directing the coordinated operations of the ALU, registers, and other components via a device processing engine (not shown). The device processor 195 may be configured to execute various instructions.

The device memory 196 may comprise multiple operation data and one or more local applications 198 associated with the server 102. The operation data may be data configured to enable one or more data processing operations such as those described in relation with the server 102. The operation data may be partially or completely different from those comprised in the server memory 130. The local applications 198 may be one or more of the services described in relation with the server 102. In some embodiments, the local applications 198 may be partially or completely different from those comprised in the server memory 130.

Network

The network 110 facilitates communication between and amongst the various devices of the system 100. The network 110 may be any suitable network operable to facilitate communication between the server 102 and the user devices 106 of the system 100. The network 110 may include any interconnecting system capable of transmitting audio, video, signals, data, data packets, messages, or any combination of the preceding. The network 110 may include all or a portion of a public switched telephone network (PSTN), a public or private data network, a LAN, a MAN, a WAN, a local, regional, or global communication or computer network, such as the Internet, a wireline or wireless network, an enterprise intranet, or any other suitable communication link, including combinations thereof, operable to facilitate communication between the devices.

Electronic Attacker

In one or more embodiments, electronic attackers 118 may be any electronic device that influences the operations of one or more devices in the network 110. In some embodiments, the electronic attacker group 120 comprises multiple devices configured to interfere with operations of devices in the network 110. The attacker group 120 comprises the electronic attacker **118*b*, the electronic attacker 118*c*, and the electronic attacker 118*d*. Each of the electronic attackers may perform one or more attacks 122 (e.g., attacks 122*a* and attacks 122*b*). The attacks 122 (e.g., one or more electronic attacks) may be one or more unexpected operations triggered by the electronic attackers 118 in the network 110. In some embodiments, a single electronic attacker 118 may perform one or more attacks 122*a*. In other embodiments, multiple electronic attackers 118 (e.g., the attacker 118*b*, the attacker 118*b*, and the attacker 118*d* in the attacker group 120) may perform one or more attacks 122*b***.

Referring as a non-limiting example to the electronic attacker **118*a* of FIG. 1, the electronic attacker 118*a* may be hardware and/or software, executed by hardware, which launches the attacks 122*a* to affect the operations performed by the server 102 and/or the user devices 106. Although not explicitly shown in FIG. 1, the electronic attacker 118*a* may include a processor, a memory, and a transceiver configured to generate one or more communication signals. In one or more embodiments, the electronic attacker 118*a* is a new device in a predetermined area in which the server 102 and/or the user devices 106 are located. In some embodiments, radio waves, electromagnetic (EM) signaling, and/or data exchange operations 174 from the electronic attacker 118*a* are monitored over time in the network 110** to be evaluated in combination with one or more aforementioned operations.

In one or more embodiments, the electronic attacker **118*a* may be a person, people, or an automated electric component that use the attacks 122*a* to hack communications and operations of a specific user device 106 and/or the server 102. As a result of the attacks 122*a*, the electronic attacker 118*a* may control communications or operations of one or more of the hacked user devices 106. In this regard, the electronic attacker 118*a* may modify, cancel, or generate communications or operations in the hacked user devices 106. The electronic attacker 118*a* may pretend to perform one or more operations on behalf of one or more of the user devices 106**.

Network Graphs

In one or more embodiments, the network graphs 190 comprise peer-to-peer and/or decentralized networking protocols and/or blockchain protocols that enable development of serverless applications. The network graphs 190 may comprise one or more artificial neural networks configured to be regulated, updated, and/or controlled by one or more of the AI algorithms 170. The network graphs 190 may include multiple electronic components or devices (i.e., nodes 191) comprising specific node data. The nodes 191 may not be required to store or validate all data in the network graphs 190. Instead, validation of each node's data may be obtained via peer accountability.

The network graphs 190 may be one or more artificial neural networks configured to act as one or more machine learning programs, or models, configured to make decisions dynamically and progressively increasing complexity of a subject matter. The network graphs 190 may be configured to comprise layers of nodes 191, or artificial neurons. The layers may comprise an input layer, one or more hidden layers, and an output layer. Each of the nodes 191 may be configured to connects to others and may comprise one or more aspects of the rules and policies 164.

In some embodiments, the nodes 191 may include own data and a reference to all other data in the network graphs 190 in accordance with rules and policies 164 preestablished by an electronic component or device outside the network graphs 190 (e.g., one or more servers, such as the server 102). These rules and policies 164 may determine how the nodes 191 interact with each other and the server 102. The rules and policies 164 may be updated dynamically or periodically with additional data received as updates via one or more planning components (e.g., electronic devices or components configured to provide updates to the rules and policies 164). The updates may be triggered by a perceived lack of knowledge level in the nodes 191. A perceived knowledge level in the nodes 191 may be identified via node scores (not shown) received from the server 102 as feedback.

The network graphs 190 may be artificial neural networks configured to modify one or more operations and/or perform regression training of one or more models 172 based on positive feedback and/or negative feedback. Under positive feedback, the artificial neural networks may be configured to receive feedback data 133 comprising one or more inputs indicating that the server 102 correctly identified an anomaly 176 and/or a deepfake 178 in one of the electronic data streams 104. Under negative feedback, the artificial neural networks may be configured to receive feedback data 133 comprising one or more inputs indicating that the server 102 incorrectly identified an anomaly 176 and/or a deepfake 178 in one of the electronic data streams 104.

In one or more embodiments, each node (i.e., out of nodes 191) in the network graphs 190 includes knowledge-specific information and information associated with peer accountability and a perceived knowledge level. Each node 191 may be configured to perform one or more neuro-symbolic processing operations that evaluate an overall format 157 of the information. Specifically, referencing a node 191 as a non-limiting example, includes rules and policies 164 and/or one or more data exchange controls. The data exchange controls may include information corresponding to at least one knowledge domain configured to evaluate aspects of the information. In some embodiments, the nodes 191 may be generated in accordance with one or more user devices 106. The nodes 191 may be communicatively coupled to one another in accordance with one or more relation paths 192 that relate the nodes 191 to one another.

In other embodiments, each of the nodes 191 includes a processor (not shown) configured to provide updates corresponding to specific data exchange controls. The processor in the nodes 191 may be configured to provide updated responses directly to the server processor 128. Further, a processor of the nodes 191 may be configured to determine one or more knowledge aspects as related by one or more relation paths 192. The network graphs 190 may be graph convolutional networks (GCNs), generative adversarial networks (GANs), Multi-Layered Perceptron (MLP), Convolution Neural Network (CNN), and/or one or more neural networks. As described above the artificial neural networks may be trained using positive feedback loops and/or negative feedback loops. The artificial neural networks may be controlled in accordance and/or by one or more machine learning models configured to organize and/or perform operations using the nodes 191 to operate in accordance with one or more of the graph convolutional networks (GCNs), generative adversarial networks (GANs), Multi-Layered Perceptron (MLP), and/or Convolution Neural Network (CNN).

The artificial neural networks may be a Multi-Layered Perceptron (MLP). The artificial neural networks may be a Multi-Layered Perceptron (MLP). In deep learning, the MLP may be a neural network consisting of fully connected neurons with nonlinear activation functions, organized in layers, notable for being able to distinguish data that is not linearly separable. The MLP may comprise fully connected and/or dense layers that transform input data from one dimension to another. The MLP may comprise an input layer, one or more hidden layers, and an output layer. The MLP may be configured to model complex relationships between inputs and outputs. The artificial neural network may be a Convolution Neural Network (CNN). The CNN may be a regularized type of feed-forward neural network that learns features by itself via a filter (or kernel) optimization.

Example Process to Perform Layered Detection of Character Anomalies in Exchanged Information Using Neural Networks FIGS. 2A and 2B illustrate an example flowchart of a process 200 configured to perform layered detection of character anomalies in exchanged information using neural networks. Modifications, additions, or omissions may be made to the process 200. The process 200 may comprise more, fewer, or other operations than those shown in FIGS. 2A and 2B. For example, operations may be performed in parallel or in any suitable order. While at times discussed as the server 102, the user devices 106, or components of any of thereof performing operations described in operations 202-274 in the process 200, any suitable system or components of the system 100 may perform one or more operations of the process 200. For example, one or more operations of the process 200 may be implemented, at least in part, in the form of instructions 132 of FIG. 1, stored on non-transitory, tangible, machine-readable media (e.g., the server memory 130 operating as a non-transitory computer-readable medium of FIG. 1) that when run by one or more processors (e.g., the server processor 128 of FIG. 1) may cause the one or more processors to perform operations described in operations 202-274.

In FIG. 2A, the process 200 starts at operation 202, where the server 102 is configured to detect an attempt to exchange an electronic data stream 104 between a transmitting device and a receiving device (e.g., network devices or one of the user devices 106). The electronic data stream 104 may comprises at least one image 138. The at least one image 138 may comprise multiple pixels 140. The at least one image 138 may comprise multiple text characters 142 formed by the pixels 140. At operation 204, the server 102 is configured to intercept the electronic data stream 104 before reaching the receiving device. In some embodiments, the server 102 may be configured to receive the electronic data stream 104 and/or a specific piece of data, data record, and/or data element transmitted to the receiving device. At operation 206, the server 102 is configured to electronically extract, from metadata 144 associated with the at least one image 138, source information 146 of the electronic data stream 104. At operation 208, the server 102 is configured to generate, based on entitlements 168 in a device profile 166 associated with the receiving device, provenance detectors 152 comprising an allowed communication source 154 and an authenticity signature 156 for the allowed communication source 154. At operation 210, the server 102 is configured to validate, using the provenance detectors 152, whether at least one identifier 148 matches the allowed communication source 154.

At operation 220, the server 102 is configured to determine whether at least one identifier 148 matches the allowed communication source 154. If the server 102 determines that the at least one identifier 148 matches the allowed communication source 154 (e.g., YES), the process 200 proceeds to operation 222. At operation 222, where the server 102 is configured to validate, using the provenance detectors 152, whether the authenticity parameter 150 matches the authenticity signature 156 corresponding to the allowed communication source 154. If the server 102 determines that at least one identifier 148 does not match the allowed communication source 154 (e.g., NO), the process 200 proceeds to operation 262 in FIG. 2B.

At operation 230, the server 102 is configured to determine whether the authenticity parameter 150 matches the authenticity signature 156 corresponding to the allowed communication source 154. If the server 102 determines that the authenticity parameter 150 matches the authenticity signature 156 corresponding to the allowed communication source 154 (e.g., YES), the process 200 proceeds to operation 232. At operation 232, where the server 102 is configured to isolate, in the at least one image, one or more of the multiple pixels 140 comprising multiple text characters 142 into isolated pixels 183. At operation 234, the server 102 is configured to remove, using an optical character recognition tool 180, noise from one or more the isolated pixels 183. Herein, noise may refer to one or more pixels 140 that obscure and/or block the image of a specific text character 142 in the image 138. After operation 234, the process 200 proceeds to operation 236 in FIG. 2B. If the server 102 determines that the authenticity parameter 150 does not match the authenticity signature 156 corresponding to the allowed communication source 154 (e.g., NO), the process 200 proceeds to operation 262 in FIG. 2B.

In FIG. 2B, the process 200 continues at operation 236, where the server 102 is configured to align, using the optical character recognition tool 180, the text characters 142 in the isolated pixels 183. At operation 238, the server 102 is configured to transform, using the optical character recognition tool 180, an aligned version of the text characters 142 in the isolated pixels 183 from an image format 181 to a text format 181. At operation 240, the server 102 is configured to provide the text characters 142 in the text format 181 to an artificial neural network (e.g., one of the network graphs 190). At operation 242, the server 102 is configured to train the artificial neural network based on input data representative of historical appearance of images (e.g., historical data 158) associated with one or more words 143 formed by the text characters 142 and data exchange operations 174 expected to be performed by the receiving device.

At operation 250, the server 102 is configured to determine whether the text characters 142 are logically positioned in the at least one image 138. If the server 102 determines that the text characters 142 are logically positioned in the at least one image 138 (e.g., YES), the process 200 proceeds to operation 260. If the server 102 determines that the text characters 142 are not logically positioned in the at least one image 138 (e.g., NO), the process 200 proceeds to operation 262.

At operation 260, the server 102 is configured to determine whether the text characters 142 are contextually related to the data exchange operations. If the server 102 determines that the text characters 142 are not logically positioned in the at least one image 138 (e.g., NO), the process 200 proceeds to operation 262. At operation 262, where the server 102 is configured to tag the at least one image 138 as comprising an anomaly 176. At operation 264, where the server 102 is configured to drop the electronic data stream 104 from the transmitting device to the receiving device. At operation 266, where the server 102 is configured to block additional electronic data streams 104 (e.g., future traffic) between the transmitting device and the receiving device. If the server 102 determines that the text characters 142 are contextually related to the data exchange operations 174 (e.g., YES), the process 200 proceeds to operation 272. At operation 272, where the server 102 is configured to tag the at least one image 138 as not comprising an anomaly 176. At operation 274, where the server 102 is configured to maintain the electronic data stream 104 from the transmitting device to the receiving device.

The process 300 may end at operation 266 or at operation 274.

In some embodiments, the server 102 may be configured to determine whether the transmitting device is associated with a previous communication comprising an anomaly 176 and add information associated with the transmitting device to a denylist 160 in response to determining that the transmitting device is associated with the previous communication comprising the anomaly 176. The server 102 may be configured to, in conjunction with transforming the aligned version of the text characters 142 in the plurality of isolated pixels 183 from the image format 181 to the text format 181, cause the optical character recognition tool 180 to obtain different text character fonts 184 and different character text image patterns 186, generate templates 182 based at least in part upon the different text character fonts 184 and the different character text image patterns 186, use at least one pattern-matching algorithm 185 to compare each of the templates 182 to each text character 142, and determine that the text characters 142 match at least one template 182. Further, the artificial neural network may be an MLP, the provenance detectors 152 may be updated during, or outside of, a maintenance window using the PIDS.

Example Process to Perform Image Analysis Using Layered Detection Neural Networks FIGS. 3A and 3B illustrate an example flowchart of a process 300 configured to perform image analysis using layered detection neural networks. Modifications, additions, or omissions may be made to the process 300. The process 300 may comprise more, fewer, or other operations than those shown in FIGS. 3A and 3B. For example, operations may be performed in parallel or in any suitable order. While at times discussed as the server 102, the user devices 106, or components of any of thereof performing operations described in operations 302-364 in the process 300, any suitable system or components of the system 100 may perform one or more operations of the process 300. For example, one or more operations of the process 300 may be implemented, at least in part, in the form of instructions 132 of FIG. 1, stored on non-transitory, tangible, machine-readable media (e.g., the server memory 130 operating as a non-transitory computer-readable medium of FIG. 1) that when run by one or more processors (e.g., the server processor 128 of FIG. 1) may cause the one or more processors to perform operations described in operations 302-364.

In FIG. 3A, the process 300 starts at operation 302, where the server 102 is configured to detect an attempt to exchange an electronic data stream 104 between a transmitting device and a receiving device (e.g., network devices or one or more of the user devices 106). The electronic data stream 104 may comprise at least one image 138. The at least one image 138 may comprise multiple pixels 140. The at least one image 138 may comprise a point of interest 151. In some embodiments, the server 102 may be configured to receive the electronic data stream 104 and/or a specific piece of data, data record, and/or data element transmitted to the receiving device. At operation 304, the server 102 is configured to intercept the electronic data stream before reaching the receiving device. At operation 306, the server 102 is configured to electronically extract, from metadata 144 associated with the at least one image 138, source information 146 of the electronic data stream 104. At operation 308, the server 102 is configured to generate, based on entitlements 168 in a device profile 166 associated with the receiving device, provenance detectors 152 comprising an allowed communication source 154 and an authenticity signature 156 for the allowed communication source 154. At operation 310, the server 102 is configured to validate, using the provenance detectors 152, whether at least one identifier 148 matches the allowed communication source 154.

At operation 320, the server 102 is configured to determine whether at least one identifier 148 matches the allowed communication source 154. If the server 102 determines that the at least one identifier 148 matches the allowed communication source 154 (e.g., YES), the process 300 proceeds to operation 322. At operation 322, where the server 102 is configured to validate, using the provenance detectors 152, whether the authenticity parameter 150 matches the authenticity signature 156 corresponding to the allowed communication source 154. If the server 102 determines that at least one identifier 148 does not match the allowed communication source 154 (e.g., NO), the process 300 proceeds to operation 352 in FIG. 3B.

At operation 330, the server 102 is configured to determine whether the authenticity parameter 150 matches the authenticity signature 156 corresponding to the allowed communication source 154. If the server 102 determines that the authenticity parameter 150 matches the authenticity signature 156 corresponding to the allowed communication source 154 (e.g., YES), the process 300 proceeds to operation 332. At operation 332, where the server 102 is configured to isolate one or more pixels 140 comprising the point of interest 151 in at least one image 138 of the electronic data stream 104 into isolated shapes 141. At operation 334, the server 102 is configured to provide the isolated shapes 141 to an artificial neural network. After operation 334, the process 300 proceeds to operation 336 in FIG. 3B. If the server 102 determines that the authenticity parameter 150 does not match the authenticity signature 156 corresponding to the allowed communication source 154 (e.g., NO), the process 300 proceeds to operation 352 in FIG. 3B.

In FIG. 3B, the process 300 continues at operation 336, where the server 102 is configured to train the artificial neural network based on input data representative of historical (e.g., historical data 158) appearance of images 138 associated with one or more isolated shapes 141 comprised in the point of interest 151 and data exchange operations 174 expected to be performed by the receiving device. At operation 338, the server 102 is configured to determine, using the trained artificial neural network, whether the isolated shapes 141 are logically positioned in the at least one image 138.

At operation 340, the server 102 is configured to determine whether the isolated shapes 141 are logically positioned in the at least one image 138. If the server 102 determines that the isolated shapes 141 are logically positioned in the at least one image 138 (e.g., YES), the process 300 proceeds to operation 350. If the server 102 determines that the isolated shapes 141 are not logically positioned in the at least one image 138 (e.g., NO), the process 300 proceeds to operation 352.

At operation 350, the server 102 is configured to determine whether the isolated shapes 141 are contextually related to the data exchange operations 174. If the server 102 determines that the isolated shapes 141 are not logically positioned in the at least one image 138 (e.g., NO), the process 300 proceeds to operation 352. At operation 352, where the server 102 is configured to tag the at least one image 138 as comprising an anomaly 176. At operation 354, where the server 102 is configured to drop the electronic data stream 104 from the transmitting device to the receiving device. At operation 356, where the server 102 is configured to block additional electronic data streams 104 (e.g., future traffic) between the transmitting device and the receiving device. If the server 102 determines that the isolated shapes 141 are contextually related to the data exchange operations (e.g., YES), the process 300 proceeds to operation 362. At operation 362, where the server 102 is configured to tag the at least one image as not comprising an anomaly 176. At operation 364, where the server 102 is configured to maintain the electronic data stream 104 from the transmitting device to the receiving device.

The process 300 may end at operation 356 or at operation 364.

In some embodiments, the server 102 may be configured to determine whether the transmitting device is associated with one or more previous communications comprising additional anomalies 176; and add information associated with the transmitting device to a denylist 160 in response to determining that the transmitting device is associated with the one or more previous communications comprising the additional anomalies 176. In some embodiments, the artificial neural network is a CNN. The CNN may be configured to be trained using negative feedback loops and/or positive feedback loops. The provenance detectors 152 may be configured to be updated during, or outside, a maintenance window using a PIDS.

Example Process to Perform Multimodal Fusion Analysis of Images to Determine Deepfakes FIG. 4 illustrates an example flowchart of a process 400 configured to configured to perform multimodal fusion analysis of images to determine deepfakes. Modifications, additions, or omissions may be made to the process 400. The process 400 may comprise more, fewer, or other operations than those shown in FIG. 4. For example, operations may be performed in parallel or in any suitable order. While at times discussed as the server 102, the user devices 106, or components of any of thereof performing operations described in operations 402-436 in the process 400, any suitable system or components of the system 100 may perform one or more operations of the process 400. For example, one or more operations of the process 400 may be implemented, at least in part, in the form of instructions 132 of FIG. 1, stored on non-transitory, tangible, machine-readable media (e.g., the server memory 130 operating as a non-transitory computer-readable medium of FIG. 1) that when run by one or more processors (e.g., the server processor 128 of FIG. 1) may cause the one or more processors to perform operations described in operations 402-436.

The process 400 starts at operation 402, where the server 102 is configured to detect attempt to exchange an electronic data stream 104 between a transmitting device and a receiving device (e.g., network devices and/or one or more of the user devices 106). The electronic data stream 104 may comprise at least one image 138. The at least one image 138 may comprise multiple text characters 142. The at least one image 138 may comprise a point of interest 151. In some embodiments, the server 102 may be configured to receive the electronic data stream 104 and/or a specific piece of data, data record, and/or data element transmitted to the receiving device. At operation 404, the server 102 is configured to intercept the electronic data stream 104 before reaching the receiving device. At operation 406, the server 102 is configured to determine a stream data exchange operation 174 associated with the electronic data stream 104. At operation 408, the server 102 is configured to provide text characters 142 and point of interest 151 in the electronic data stream 104 to an artificial neural network. At operation 410, the server 102 is configured to train the artificial neural network based on input data representative of historical appearance (e.g., historical data 158) of images associated with one or more words 143 formed by the text characters 142, one or more shapes 141 comprised in the point of interest 151, and one or more data exchange operations 174 expected to be performed by the receiving device. At operation 412, the server 102 is configured to calculate, using the trained artificial neural network, an intent 187 associated with the stream data exchange operation 174. At operation 414, the server 102 is configured to calculate, using the trained artificial neural network, whether the text characters 142 and the shapes 141 in the point of interest 151 are logically arranged in the at least one image 138 to match the intent.

At operation 420, the server 102 is configured to determine whether the text characters 142 and the shapes 141 in the point of interest 151 are logically arranged in the at least one image to match the intent. If the server 102 determines that the text characters 142 and the shapes 141 in the point of interest 151 are logically arranged in the at least one image to match the intent 187 (e.g., YES), the process 400 proceeds to operation 422. At operation 422, where the server 102 is configured to tag electronic data stream 104 as not comprising a deepfake 178. In response to tagging the electronic data stream 104 as not comprising a deepfake 178, the server 102 may be configured to maintain the electronic data stream 104 from the transmitting device to the receiving device. If the server 102 determines that the text characters 142 and the shapes 141 in the point of interest 151 are not logically arranged in the at least one image 138 to match the intent 187 (e.g., NO), the process 400 proceeds to operation 432. At operation 432, the server 102 is configured to tag electronic data stream 104 as comprising a deepfake 178. In response to tagging the electronic data stream 104 as comprising a deepfake 178, the server 102 may be configured to drop the electronic data stream 104 from the transmitting device to the receiving device. At operation 436, the server 102 may be configured to block additional electronic data streams 104 (e.g., future traffic) between the transmitting device and the receiving device.

The process 400 may end at operation 424 or at operation 436.

In some embodiments, the server 102 may be configured to determine whether the transmitting device is associated with a previous communication comprising an additional deepfake 178 and add information associated with the transmitting device to a denylist 160 in response to determining that the transmitting device is associated with the previous communication comprising the additional deepfake 178. The artificial neural network may be trained in accordance a negative feedback loop. The artificial neural network may be a multimodal fusion deep learning network that comprises at least one CNN and at least one MLP. The artificial neural network may be trained using example images comprising shape deepfakes 178. The artificial neural network may be trained using example text images comprising text character deepfakes 178.

Scope of the Disclosure

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated with another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

The invention claimed is:

1. A system, comprising:

a memory operable to store:

a device profile associated with a receiving device, the device profile comprising a plurality of entitlements for the receiving device; and at least one processor communicatively coupled to the memory and configured to:

detect a request to exchange an electronic data stream between a transmitting device and the receiving device, wherein:

the electronic data stream comprises at least one image;

the at least one image comprising a plurality of pixels; and the at least one image comprises a plurality of text characters;

intercept the electronic data stream before reaching the receiving device;

electronically extract, from metadata associated with the at least one image, source information of the electronic data stream, the source information comprising at least one identifier and an authenticity parameter associated with the transmitting device;

generate, based at least in part upon the plurality of entitlements in the device profile associated with the receiving device, a plurality of provenance detectors comprising an allowed communication source and an authenticity signature for the allowed communication source;

validate, using the plurality of provenance detectors, whether the at least one identifier matches the allowed communication source;

in response to validating that the at least one identifier matches the allowed communication source, validate, using the plurality of provenance detectors, whether the authenticity parameter matches the authenticity signature corresponding to the allowed communication source;

in response to validating that the authenticity parameter matches the authenticity signature corresponding to the allowed communication source, isolate, in the at least one image, one or more pixels of the plurality of pixels comprising the plurality of text characters into isolated pixels;

align, using an optical character recognition tool, the plurality of text characters2 in the isolated pixels;

transform, using the optical character recognition tool, an aligned version of the plurality of text characters in the isolated pixels from an image format to a text format;

provide the plurality of text characters in the text format and the at least one image to an artificial neural network;

train the artificial neural network based on historical data associated with one or more words formed by the plurality of text characters and a plurality of data exchange operations expected to be performed by the receiving device;

determine, using the trained artificial neural network, whether the plurality of text characters are logically positioned in the at least one image;

in response to determining that the plurality of text characters are logically positioned in the at least one image, determine, using the trained artificial neural network, whether the plurality of text characters are contextually related to the plurality of data exchange operations expected to be performed by the receiving device;

in response to determining that the plurality of text characters are not contextually related to the plurality of data exchange operations expected to be performed by the receiving device, tag the at least one image as comprising an anomaly;

drop the electronic data stream from the transmitting device to the receiving device; and block electronic data streams between the transmitting device and the receiving device.

2. The system of claim 1, wherein the at least one processor is further configured to:

determine whether the transmitting device is associated with a previous communication comprising an additional anomaly; and in response to determining that the transmitting device is associated with the previous communication comprising the additional anomaly, add information associated with the transmitting device to a denylist.

3. The system of claim 1, wherein, in conjunction with transforming the aligned version of the plurality of text characters in the isolated pixels from the image format to the text format, the optical character recognition tool is configured to:

obtain a plurality of different text character fonts and a plurality of different image patterns;

generate a plurality of templates based at least in part upon the plurality of different text character fonts and the plurality of different image patterns;

use at least one pattern-matching algorithm to compare each of the plurality of templates to each text characters of the plurality of text characters; and determine that the plurality of text characters matches at least one template of the plurality of templates.

4. The system of claim 1, wherein:

the artificial neural network is a Multi-Layered Perceptron (MLP).

5. The system of claim 1, wherein the at least one processor is further configured to:

detect an additional attempt to exchange an additional electronic data stream between an additional transmitting device and the receiving device, wherein:

the additional electronic data stream comprises at least one additional image;

the at least one additional image comprising a plurality of additional pixels; and the at least one additional image comprises an additional plurality of text characters;

intercept the additional electronic data stream before reaching the receiving device;

electronically extract, from additional metadata associated with the at least one additional image, additional source information of the additional electronic data stream, the additional source information comprising at least one additional identifier and an additional authenticity parameter associated with the transmitting device;

validate, using the plurality of provenance detectors, whether the at least one additional identifier matches an additional allowed communication source;

in response to validating that the at least one additional identifier matches the additional allowed communication source, validate, using the plurality of provenance detectors, whether the additional authenticity parameter matches an additional authenticity signature corresponding to the additional allowed communication source;

in response to validating that the additional authenticity parameter matches the additional authenticity signature corresponding to the additional allowed communication source, isolate, in the at least one additional image, one or more additional pixels of the plurality of additional pixels comprising the additional plurality of text characters into an additional plurality of isolated pixels;

align, using the optical character recognition tool, the additional plurality of text characters in the additional plurality of isolated pixels;

transform, using the optical character recognition tool, an additional aligned version of the additional plurality of text characters in the additional plurality of isolated pixels from the image format to the text format;

provide the additional plurality of text characters in the text format and the at least one additional image to the artificial neural network;

train the artificial neural network based on historical data associated with one or more words formed by the additional plurality of text characters and the plurality of data exchange operations expected to be performed by the receiving device;

determine, using the trained artificial neural network, whether the additional plurality of text characters is logically positioned in the at least one additional image;

in response to determining that the additional plurality of text characters is logically positioned in the at least one additional image, determine, using the trained artificial neural network, whether the additional plurality of text characters is contextually related to the plurality of data exchange operations expected to be performed by the receiving device;

in response to determining that the additional plurality of text characters is contextually related to the plurality of data exchange operations expected to be performed by the receiving device, tag the at least one additional image as not comprising an additional anomaly; and maintain the electronic data stream from the transmitting device to the receiving device.

6. The system of claim 1, wherein:

the plurality of provenance detectors is updated during a maintenance window using a provenance-based intrusion detection system (PIDS).

7. The system of claim 1, wherein:

the plurality of provenance detectors is updated outside a maintenance window using a provenance-based intrusion detection system (PIDS).

8. A method, comprising:

detecting a request to exchange an electronic data stream between a transmitting device and a receiving device, wherein:

determining, using the trained artificial neural network, whether the plurality of text characters are logically positioned in the at least one image;

in response to determining that the plurality of text characters are logically positioned in the at least one image, determining, using the trained artificial neural network, whether the plurality of text characters are contextually related to the plurality of data exchange operations expected to be performed by the receiving device;

in response to determining that the plurality of text characters are not contextually related to the plurality of data exchange operations expected to be performed by the receiving device, tagging the at least one image as comprising an anomaly;

dropping the electronic data stream from the transmitting device to the receiving device; and blocking electronic data streams between the transmitting device and the receiving device.

9. The method of claim 8, further comprising:

determining whether the transmitting device is associated with a previous communication comprising an additional anomaly; and in response to determining that the transmitting device is associated with the previous communication comprising the additional anomaly, adding information associated with the transmitting device to a denylist.

10. The method of claim 8, wherein, in conjunction with transforming the aligned version of the plurality of text characters in the isolated pixels from the image format to the text format, the optical character recognition tool is configured to perform one or more operations comprising:

obtaining a plurality of different text character fonts and a plurality of different character text image patterns;

generating a plurality of templates based at least in part upon the plurality of different text character fonts and the plurality of different character text image patterns;

using at least one pattern-matching algorithm to compare each of the plurality of templates to each text characters of the plurality of text characters; and determining that the plurality of text characters matches at least one template of the plurality of templates.

11. The method of claim 8, wherein:

the artificial neural network is a Multi-Layered Perceptron (MLP).

12. The method of claim 8, further comprising:

detecting an additional attempt to exchange an additional electronic data stream between an additional transmitting device and the receiving device, wherein:

the additional electronic data stream comprises at least one additional image;

the at least one additional image comprising a plurality of additional pixels; and the at least one additional image comprises an additional plurality of text characters;

intercepting the additional electronic data stream before reaching the receiving device;

electronically extracting, from additional metadata associated with the at least one additional image, additional source information of the additional electronic data stream, the additional source information comprising at least one additional identifier and an additional authenticity parameter associated with the transmitting device;

validating, using the plurality of provenance detectors, whether the at least one additional identifier matches an additional allowed communication source;

in response to validating that the at least one additional identifier matches the additional allowed communication source, validating, using the plurality of provenance detectors, whether the additional authenticity parameter matches an additional authenticity signature corresponding to the additional allowed communication source;

in response to validating that the additional authenticity parameter matches the additional authenticity signature corresponding to the additional allowed communication source, isolating, in the at least one additional image, one or more additional pixels of the plurality of additional pixels comprising the additional plurality of text characters into an additional plurality of isolated pixels;

aligning, using an optical character recognition tool, the additional plurality of text characters in the additional plurality of isolated pixels;

transforming, using the optical character recognition tool, an additional aligned version of the additional plurality of text characters in the additional plurality of isolated pixels from the image format to the text format;

providing the additional plurality of text characters in the text format and the at least one additional image to the artificial neural network;

training the artificial neural network based on historical data associated with one or more words formed by the additional plurality of text characters and the plurality of data exchange operations expected to be performed by the receiving device;

determining, using the trained artificial neural network, whether the additional plurality of text characters is logically positioned in the at least one additional image;

in response to determining that the additional plurality of text characters is logically positioned in the at least one additional image, determining, using the trained artificial neural network, whether the additional plurality of text characters is contextually related to the plurality of data exchange operations expected to be performed by the receiving device;

in response to determining that the additional plurality of text characters is contextually related to the plurality of data exchange operations expected to be performed by the receiving device, tagging the at least one additional image as not comprising an additional anomaly; and maintaining the electronic data stream from the transmitting device to the receiving device.

13. The method of claim 8, wherein:

the plurality of provenance detectors is updated during a maintenance window using a provenance-based intrusion detection system (PIDS).

14. The method of claim 8, wherein:

the plurality of provenance detectors is updated outside a maintenance window using a provenance-based intrusion detection system (PIDS).

15. A non-transitory computer-readable medium storing instructions that when executed by a processor cause the processor to:

detect a request to exchange an electronic data stream between a transmitting device and a receiving device, wherein:

determine, using the trained artificial neural network, whether the plurality of text characters are logically positioned in the at least one image;

in response to determining that the plurality of text characters are logically positioned in the at least one image, determine, using the trained artificial neural network, whether the plurality of text characters are contextually related to the plurality of data exchange operations expected to be performed by the receiving device;

in response to determining that the plurality of text characters are not contextually related to the plurality of data exchange operations expected to be performed by the receiving device, tag the at least one image as comprising an anomaly;

drop the electronic data stream from the transmitting device to the receiving device; and block electronic data streams between the transmitting device and the receiving device.

16. The non-transitory computer-readable medium of claim 15, wherein, when executed by the processor, the instructions further cause the processor to:

determine whether the transmitting device is associated with a previous communication comprising an additional anomaly; and in response to determining that the transmitting device is associated with the previous communication comprising the additional anomaly, add information associated with the transmitting device to a denylist.

17. The non-transitory computer-readable medium of claim 15, wherein, when executed by the processor, the instructions further cause the processor to:

in conjunction with transforming the aligned version of the plurality of text characters in the isolated pixels from the image format to the text format, the optical character recognition tool is configured to:

obtain a plurality of different text character fonts and a plurality of different character text image patterns;

generate a plurality of templates based at least in part upon the plurality of different text character fonts and the plurality of different character text image patterns;

use at least one pattern-matching algorithm to compare each of the plurality of templates to each text characters of the plurality of text characters; and determine that the plurality of text characters matches at least one template of the plurality of templates.

18. The non-transitory computer-readable medium of claim 15, wherein:

the artificial neural network is a Multi-Layered Perceptron (MLP).

19. The non-transitory computer-readable medium of claim 15, wherein, when executed by the processor, the instructions further cause the processor to:

detect an additional attempt to exchange an additional electronic data stream between an additional transmitting device and the receiving device, wherein:

the additional electronic data stream comprises at least one additional image;

the at least one additional image comprising a plurality of additional pixels; and the at least one additional image comprises an additional plurality of text characters;

intercept the additional electronic data stream before reaching the receiving device;

electronically extract, from additional metadata associated with the at least one additional image, additional source information of the additional electronic data stream, the additional source information comprising at least one additional identifier and an additional authenticity parameter associated with the transmitting device;

validate, using the plurality of provenance detectors, whether the at least one additional identifier matches an additional allowed communication source;

in response to validating that the at least one additional identifier matches the additional allowed communication source, validate, using the plurality of provenance detectors, whether the additional authenticity parameter matches an additional authenticity signature corresponding to the additional allowed communication source;

in response to validating that the additional authenticity parameter matches the additional authenticity signature corresponding to the additional allowed communication source, isolate, in the at least one additional image, one or more additional pixels of the plurality of additional pixels comprising the additional plurality of text characters into an additional plurality of isolated pixels;

align, using the optical character recognition tool, the additional plurality of text characters in the additional plurality of isolated pixels;

transform, using the optical character recognition tool, an additional aligned version of the additional plurality of text characters in the additional plurality of isolated pixels from the image format to the text format;

provide the additional plurality of text characters in the text format and the at least one additional image to the artificial neural network;

train the artificial neural network based on historical data associated with one or more words formed by the additional plurality of text characters and the plurality of data exchange operations expected to be performed by the receiving device;

determine, using the trained artificial neural network, whether the additional plurality of text characters is logically positioned in the at least one additional image;

in response to determining that the additional plurality of text characters is logically positioned in the at least one additional image, determine, using the trained artificial neural network, whether the additional plurality of text characters is contextually related to the plurality of data exchange operations expected to be performed by the receiving device;

in response to determining that the additional plurality of text characters is contextually related to the plurality of data exchange operations expected to be performed by the receiving device, tag the at least one additional image as not comprising an additional anomaly; and maintain the electronic data stream from the transmitting device to the receiving device.

20. The non-transitory computer-readable medium of claim 15, wherein:

the plurality of provenance detectors is updated during a maintenance window using a provenance-based intrusion detection system (PIDS).

* * * * *